US012640672B2

(12) United States Patent
Taniguchi et al.

(10) Patent No.: US 12,640,672 B2
(45) Date of Patent: May 26, 2026

(54) SYNCHRONOUS-MOTOR CONTROL DEVICE AND ELECTRIC VEHICLE

(71) Applicant: HITACHI ASTEMO, LTD., Hitachinaka (JP)

(72) Inventors: Shun Taniguchi, Tokyo (JP); Noriya Nakao, Tokyo (JP); Kentaro Matsuo, Hitachinaka (JP); Kazuaki Tobari, Tokyo (JP); Toshiyuki Ajima, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 162 days.

(21) Appl. No.: 18/683,522

(22) PCT Filed: Mar. 3, 2022

(86) PCT No.: PCT/JP2022/009261
§ 371 (c)(1),
(2) Date: Feb. 14, 2024

(87) PCT Pub. No.: WO2023/037588
PCT Pub. Date: Mar. 16, 2023

(65) Prior Publication Data
US 2024/0356470 A1 Oct. 24, 2024

(30) Foreign Application Priority Data

Sep. 10, 2021 (JP) ................................. 2021-148170

(51) Int. Cl.
$H02P\ 21/20$ (2016.01)
$H02P\ 21/14$ (2016.01)
$H02P\ 25/022$ (2016.01)

(52) U.S. Cl.
CPC ............ *H02P 21/20* (2016.02); *H02P 21/141* (2013.01); *H02P 25/022* (2013.01); *H02P 2205/05* (2013.01)

(58) Field of Classification Search
CPC ...... H02P 21/20; H02P 21/141; H02P 25/022; H02P 2205/05
(Continued)

(56) References Cited

U.S. PATENT DOCUMENTS 8,975,841 B2 * 3/2015 Maekawa ........... H02P 21/0089
318/400.15
9,787,230 B2 * 10/2017 Nakajima ................. H02P 6/28
(Continued)

FOREIGN PATENT DOCUMENTS

JP 2000-050689 A 2/2000
JP 2018-042324 A 3/2018
(Continued)

OTHER PUBLICATIONS

International Search Report of PCT/JP2022/009261 dated May 17, 2022.

*Primary Examiner* — David Luo
(74) *Attorney, Agent, or Firm* — MATTINGLY & MALUR, PC

(57) ABSTRACT

A synchronous-motor control device includes a torque-command-value conversion unit for converting a torque command value for a synchronous motor into a second-torque command value which gradually increases in a region including a peak of a torque of the synchronous motor, a voltage-phase control unit for controlling a voltage phase angle such that the torque of the synchronous motor matches the second-torque command value, and a power conversion unit for converting DC power into AC power based on the voltage phase angle and a rotational angle of the synchro- (Continued)

nous motor, and for outputting the AC power resulted from the conversion to the synchronous motor.

15 Claims, 25 Drawing Sheets

(58) Field of Classification Search
USPC ...................... 318/432, 400.02, 400.01, 700
See application file for complete search history.

(56) References Cited

U.S. PATENT DOCUMENTS

| | | | | |
|---|---|---|---|---|
| 9,831,812 | B2 * | 11/2017 | Qiao ........................ | H02P 21/30 |
| 10,742,151 | B2 * | 8/2020 | Taniguchi ............... | H02P 27/08 |
| 2019/0199260 | A1 | 6/2019 | Taniguchi et al. | |

FOREIGN PATENT DOCUMENTS

| | | |
|---|---|---|
| JP | 2018-057077 A | 4/2018 |
| JP | 2019-047568 A | 3/2019 |

* cited by examiner

SYNCHRONOUS-MOTOR CONTROL DEVICE AND ELECTRIC VEHICLE

TECHNICAL FIELD

The present invention relates to synchronous-motor control devices and electric vehicles.

BACKGROUND ART

Driving for rotating a synchronous motor has been performed by converting DC power into AC power through a power conversion unit and applying a rectangular-wave voltage to the synchronous motor. This voltage phase control can increase the output from the synchronous motor in a high-speed rotation range and, also, can decrease the number of switching operations in the power conversion unit, thereby suppressing the switching loss. Further, in order to improve the voltage utilization rate of the synchronous motor, there has been used pulse saving control for reducing the number of pulses in one cycle of the rectangular-wave voltage.

Patent Literature 1 describes a technique for performing torque feedback control for setting a voltage phase Ψ in such a way as to reduce a torque deviation ΔT, wherein the range of the voltage phase is limited to a predetermined phase range, in order to make the actual outputted torque closer to a torque command value without inducing a failure of the control.

CITATION LIST

Patent Literature

PTL 1: JP 2000-50689 A

SUMMARY OF INVENTION

Technical Problem

Conventionally, a motor has been controlled in such a way as to impose a limit on the maximum torque of the motor, in order to prevent failures of the control, which has raised the problem that the motor can not sufficiently exert the torque which the motor is inherently capable of outputting.

Solution to Problem

A synchronous-motor control device according to the present invention includes a torque-command-value conversion unit for converting a torque command value for a synchronous motor into a second-torque command value which gradually increases in a region including a peak of a torque of the synchronous motor, a voltage-phase control unit for controlling a voltage phase angle such that the torque of the synchronous motor matches the second-torque command value, and a power conversion unit for converting DC power into AC power based on the voltage phase angle and a rotational angle of the synchronous motor, and for outputting the AC power resulted from the conversion to the synchronous motor.

Advantageous Effects of Invention

According to the present invention, it is possible to utilize the torque which can be outputted from the synchronous motor, without imposing a limit thereon, through the voltage phase control.

BRIEF DESCRIPTION OF DRAWINGS

FIG. 7 is a graph illustrating the relationship between a voltage phase angle and the torque.

FIG. 14 is a structural block diagram of a second-torque calculation unit in a fifth modification example.

FIG. 15 is a structural block diagram of a second-torque command value calculation unit in a sixth modification example.

FIG. 20 is a structural block diagram of a voltage-phase control unit according to the second embodiment.

FIG. 23 is a structural block diagram of a voltage-phase control unit according to the third embodiment.

DESCRIPTION OF EMBODIMENTS

First Embodiment

Figure 1:
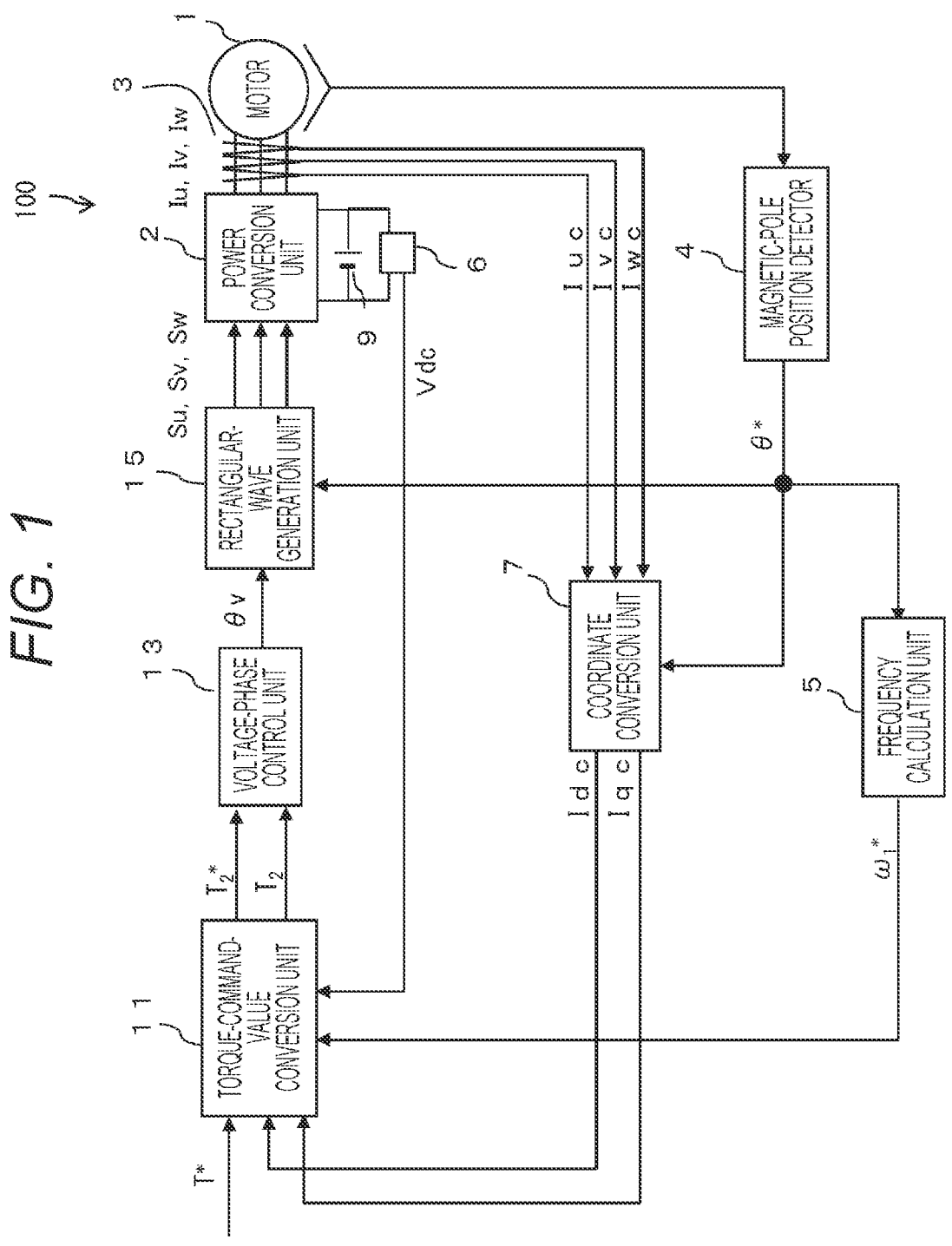
FIG. 1 is a structural block diagram of a synchronous-motor control device according to a first embodiment.

FIG. 1 is a structural block diagram of a synchronous-motor control device 100 according to a first embodiment.

The synchronous-motor control device 100 drives and controls a synchronous motor 1. The synchronous motor (PMSM: Permanent Magnet Synchronous Motor) 1 has, for example, a rotating-field type structure including a rotor provided with permanent magnets, and a stator provided with armature windings. Incidentally, the synchronous motor 1 is not limited to a permanent magnet synchronous motor, and may be a synchronous motor such as a synchronous reluctance motor, a permanent magnet synchronous generator, or a wound-type synchronous machine.

The synchronous-motor control device 100 includes a power conversion unit 2, a current detector 3, a magnetic-pole position detector 4, a frequency calculation unit 5, a voltage detector 6, a coordinate conversion unit 7, a DC voltage source 9, a torque-command-value conversion unit 11, a voltage-phase control unit 13, and a rectangular-wave generation unit 15.

The power conversion unit 2 includes semiconductor switching elements constituting upper and lower arms for three phases. The semiconductor switching elements may be constituted by IGBTs, MOSFETs, or other power semiconductor elements. The power conversion unit 2 operates the semiconductor switching elements according to pulse signals Su, Sv, and Sw, which will be described later, to convert DC power from the DC voltage source 9 (for example, a battery) into AC power, thereby driving the synchronous motor 1.

The current detector 3, which is constituted by a Hall CT (Current Transformer) or the like, detects the values Iuc, Ivc and Iwc of three-phase currents for a U phase, a V phase and a W phase which are flowing from the power conversion unit 2 to the synchronous motor 1.

The magnetic-pole position detector 4, which is constituted by a resolver or the like, detects the magnetic-pole positions in the synchronous motor 1, and outputs magnetic-pole position information $\theta^*$.

The frequency calculation unit 5 outputs speed information $\omega 1^*$, through differentiating calculation, for example, from the magnetic-pole position information $\theta^*$ detected by the magnetic-pole position detector 4.

The voltage detector 6 detects the DC voltage Vdc supplied from the DC voltage source 9 to the power conversion unit 2.

The coordinate conversion unit 7 performs coordinate conversion on the current values Iuc, Ivc, and Iwc detected by the current detector 3 with the magnetic-pole position information $\theta^*$ detected by the magnetic-pole position detector 4, and outputs a d-axis current detected value Idc and a q-axis current detected value Iqc.

The torque-command-value conversion unit 11 calculates second torque T2 and a second-torque command value T2*, using a torque command value T*, the DC voltage Vdc, the speed information $\omega 1^*$, the d-axis current detected value Idc, and the q-axis current detected value Iqc. The torque command value T* is a torque command value for the synchronous motor 1, which is inputted from a higher-level control device (not illustrated). The torque-command-value conversion unit 11 converts the torque command value T* into a second-torque command value T2*. Specifically, the torque-command-value conversion unit 11 calculates a d-axis current command value Id* and a q-axis current command value Iq* based on the torque command value T* for the synchronous motor 1, the DC voltage Vdc, and the speed information $\omega 1^*$. Thereafter, the torque-command-value conversion unit 11 multiplies the d-axis current command value Id* by the q-axis current command value Iq* to convert them into the second-torque command value T2*. The second-torque command value T2* is a value which gradually increases in a region including the peak of the torque T of the synchronous motor 1. In the present embodiment, the second-torque command value T2* will be described by exemplifying, thereas, a value proportional to a reluctance torque. The torque-command-value conversion unit 11 will be described in detail later with reference to FIG. 2.

The voltage-phase control unit 13 outputs a voltage phase angle $\theta v$ through feedback control, such that the torque T of the synchronous motor 1 matches the second-torque command value T2*. The voltage-phase control unit 13 will be described in detail later with reference to FIG. 7.

The rectangular-wave generation unit 15 generates pulse signals Su, Sv, Sw based on the voltage phase angle $\theta v$, and outputs these pulse signals Su, Sv, Sw to the power conversion unit 2. The rectangular-wave generation unit 15 will be described in detail later with reference to FIG. 8.

Figure 2:
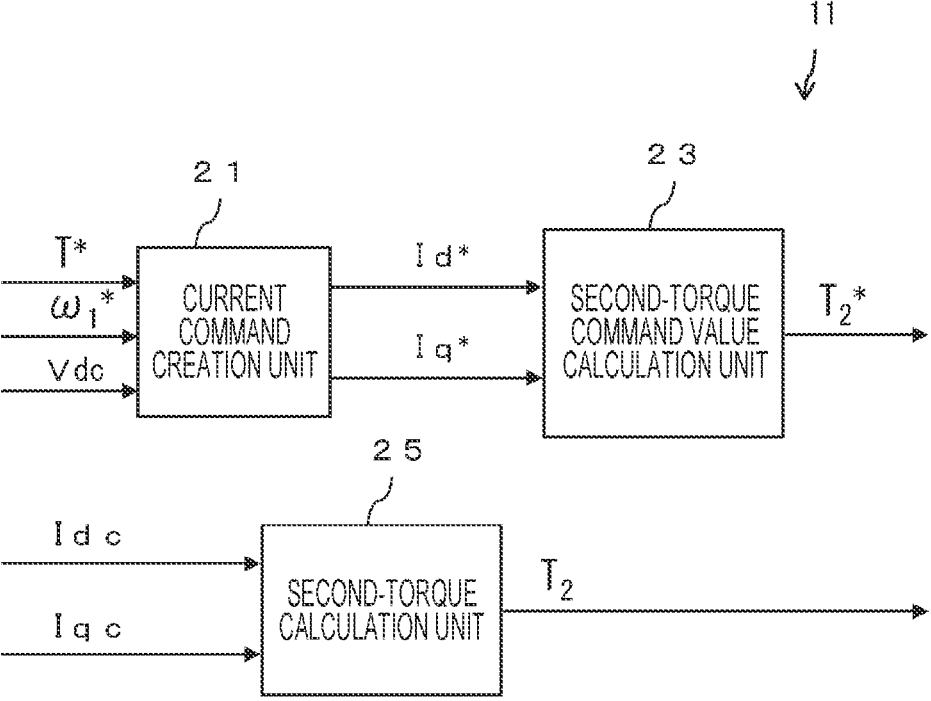
FIG. 2 is a structural block diagram of a torque-command-value conversion unit.

FIG. 2 is a structural block diagram of the torque-command-value conversion unit 11.

The torque-command-value conversion unit 11 includes a current command creation unit 21, a second-torque command value calculation unit 23, and a second-torque calculation unit 25.

The current command creation unit 21 receives the torque command value T*, the DC voltage Vdc, and the speed information $\omega 1^*$, and creates a d-axis current command value Id* and a q-axis current command value Iq* using, for example, a lookup table or the like. The current command creation unit 21 converts the torque command value T* into the d-axis current command value Id* and the q-axis current command value Iq*.

Then, the second-torque command value calculation unit 23 calculates and outputs a second-torque command value T2*, based on the d-axis current command value Id* and the q-axis current command value Iq*. The second-torque command value calculation unit 23 multiplies the d-axis current command value Id* by the q-axis current command value Iq* to obtain the second-torque command value T2* proportional to the reluctance torque, although the second-torque command value calculation unit 23 will be described in detail later with reference to FIG. 3, which will be described later.

The second-torque calculation unit 25 calculates second torque T2 based on the d-axis current detected value Idc and the q-axis current detected value Iqc, which have been resulted from the conversion of the current values Iuc, Ivc, Iwc detected by the current detector 3 thereinto by the coordinate conversion unit 7. The second-torque calculation unit 25 basically multiplies the d-axis current detected value Idc by the q-axis current detected value Iqc to obtain the second torque T2 proportional to the reluctance torque of the synchronous motor 1, although the second-torque calculation unit 25 will be described in detail later with reference to FIG. 4, which will be described later.

Figure 3:
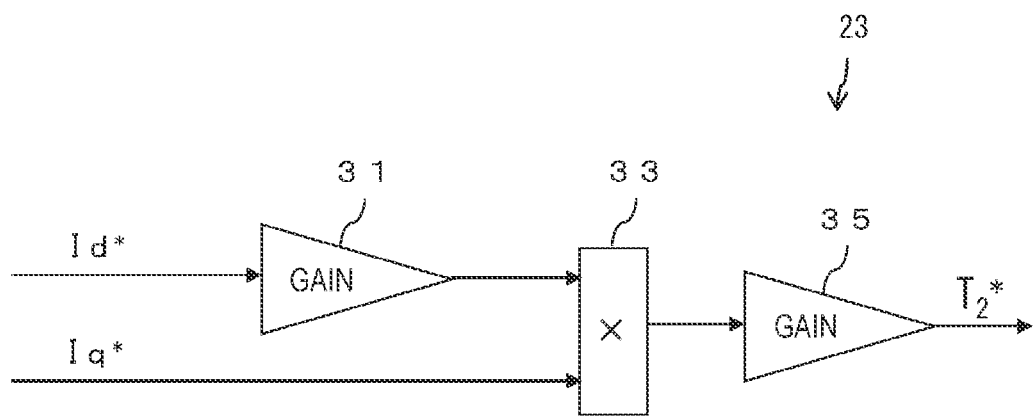
FIG. 3 is a structural block diagram of a second-torque command value calculation unit.

FIG. 3 is a structural block diagram of the second-torque command value calculation unit 23.

As illustrated in FIG. 3, the second-torque command value calculation unit 23 multiplies the d-axis current command value Id* by a first gain 31, further multiplies the q-axis current command value Iq* by the d-axis current command value Id* multiplied by the first gain 31 through a multiplier 33, and further multiplies the result of this multiplication by a second gain 35. In this way, the second-torque command value T2* is determined.

In the synchronous motor 1, reluctance torque is generated in addition to torque caused by the permanent magnets. The first gain 31 illustrated in FIG. 3 can be set at Ld-Lq which corresponds to the difference between a d-axis inductance Ld and a q-axis inductance Lq, and the second gain 35 can be set at the number of pole pairs in the synchronous motor 1, in order to make the second-torque command value T2* be the reluctance torque. Incidentally, the first gain 31 and the second gain 35 can have arbitrary values, and the first gain 31 and the second gain 35 may be omitted. For example, this structure can also be applied to a surface magnet type synchronous motor (SPMSM: Surface Permanent Magnet Synchronous Motor) which induces no reluctance torque in actual.

Figure 4:
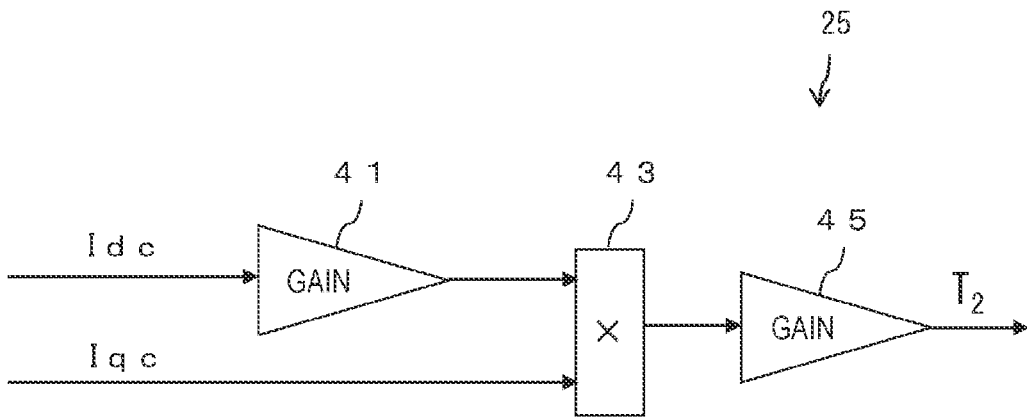
FIG. 4 is a structural block diagram of a second-torque calculation unit.

FIG. 4 is a structural block diagram of the second-torque calculation unit 25.

As illustrated in FIG. 4, the second-torque calculation unit 25 multiplies the d-axis current detected value Idc by a third gain 41, further multiplies the q-axis current detected value Iqc by the d-axis current detected value Idc multiplied by the third gain 41, and further multiplies the result of this multiplication by a fourth gain 45. In this way, the second torque T2 of the synchronous motor 1 is determined.

As described above, in the synchronous motor 1, reluctance torque is generated in addition to torque caused by the permanent magnets. The third gain 41 illustrated in FIG. 4 can be set at Ld-Lq which corresponds to the difference between the d-axis inductance Ld and the q-axis inductance Lq, and the fourth gain 45 can be set at the number of pole pairs in the synchronous motor 1, in order to make the second torque T2 be the reluctance torque. Incidentally, the third gain 41 and the fourth gain 45 can have arbitrary values, and the third gain 41 and the fourth gain 45 may be omitted. For example, this structure can also be applied to a surface magnet type synchronous motor (SPMSM: Surface Permanent Magnet Synchronous Motor) which induces no reluctance torque in actual.

Incidentally, in the second-torque command value calculation unit 23 in FIG. 3 and the second-torque calculation unit 25 in FIG. 4, the first gain 31 and the third gain 41 are illustrated as having constant values, but the d-axis inductance Ld or the q-axis inductance Lq may be made variable depending on the current, in consideration of magnetic saturation. By making these gains variable, the response can be made constant.

Figure 5:
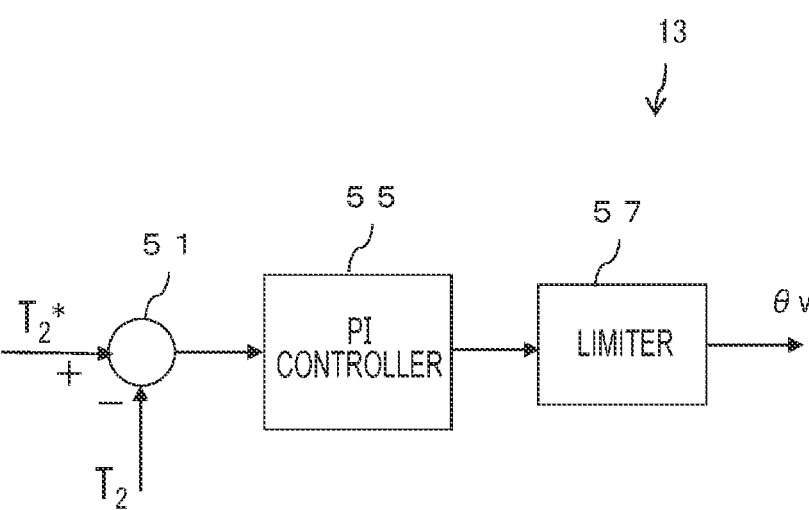
FIG. 5 is a structural block diagram of a voltage-phase control unit.

FIG. 5 is a structural block diagram of the voltage-phase control unit 13.

The voltage-phase control unit 13 outputs a voltage phase angle θv through feedback control, such that the second torque T2 matches the second-torque command value T2*. As illustrated in FIG. 5, the difference between the second torque T2 and the second-torque command value T2* is calculated by a differentiator 51, and this difference is passed through a PI controller 55 (or an I controller) and, then, is subjected to limiting processing by a limiter 57 to fall within such a range that the torque does not exceed the peak. As a result, the voltage phase angle θv is outputted.

Figure 6:
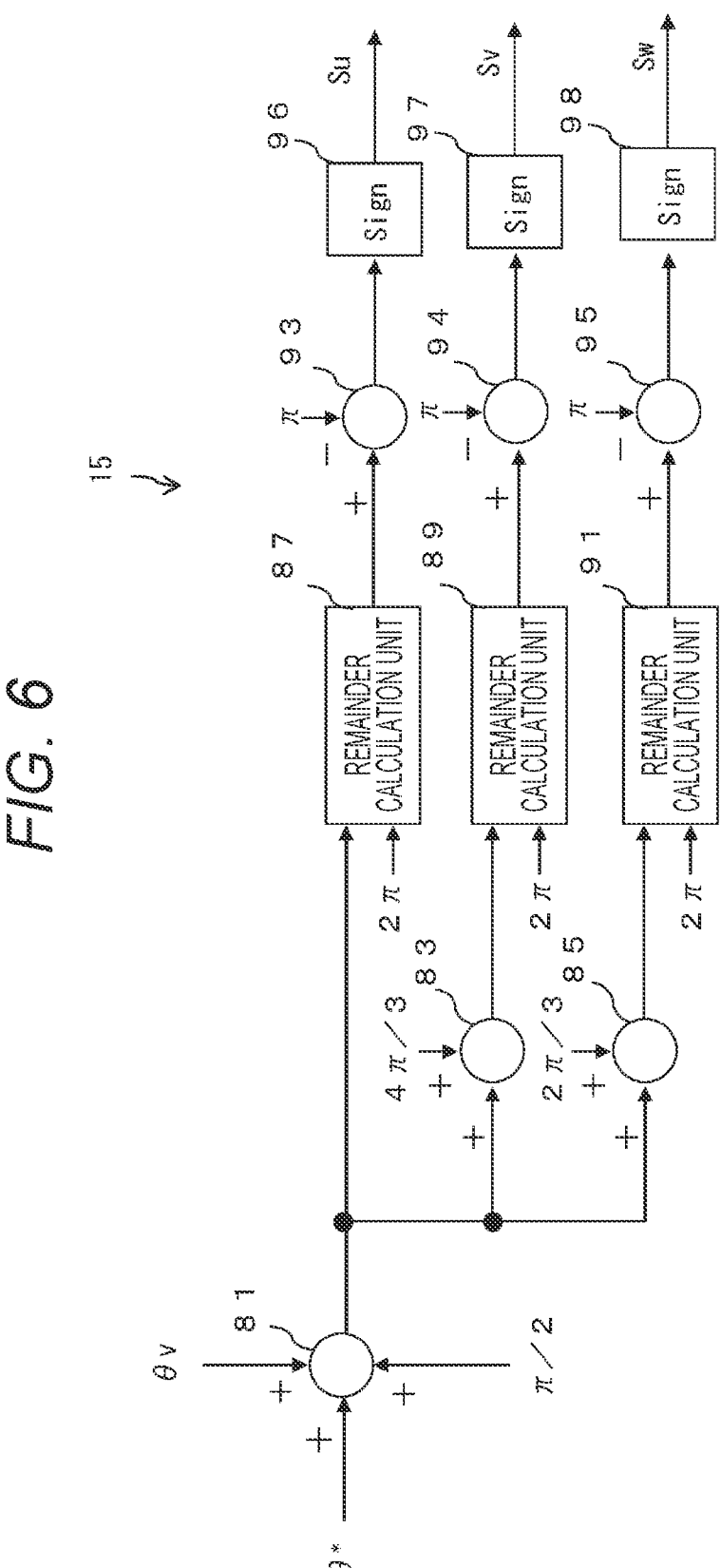
FIG. 6 is a structural block diagram of a rectangular-wave generation unit.

FIG. 6 is a structural block diagram of the rectangular-wave generation unit 15.

The rectangular-wave generation unit 15 includes adders 81, 83 and 85, remainder calculation units 87, 89 and 91, differentiators 93, 94 and 95, and sign determination units 96, 97 and 98.

As illustrated in FIG. 6, the adder 81 adds the voltage phase angle θv and π/2 to the magnetic-pole position information θ* to create a voltage phase signal. The remainder calculation unit 87 calculates a remainder resulted from division of the created voltage phase signal by 2π. Then, the differentiator 93 subtracts π therefrom, and the sign determination unit 96 determines the sign thereof and outputs a pulse signal Su according to the result of the determination. For example, if the result of the determination by the sign determination unit 96 is positive, +1 is outputted, and if the result of the determination is negative, −1 is outputted.

The adder 83 adds 4π/3 to the voltage phase signal created by the adder 81. The remainder calculation unit 89 calculates a remainder resulted from division of the voltage phase signal having been subjected to the addition by 2π. Then, the differentiator 94 subtracts π therefrom, and the sign determination unit 97 determines the sign thereof and outputs a pulse signal Sv according to the result of the determination.

The adder 85 adds 2π/3 to the voltage phase signal created by the adder 81. The remainder calculation unit 91 calculates a remainder resulted from division of the voltage phase signal having been subjected to the addition by 2π. Then, the differentiator 95 subtracts π therefrom, and the sign determination unit 98 determines the sign thereof and outputs a pulse signal Sw according to the result of the determination.

In this manner, the rectangular-wave generation unit 15 generates the pulse signals Su, Sv and Sw for the UVW phases, which are composed of signals of +1 or −1, according to the voltage phase angle θv. The power conversion unit 2 includes the semiconductor switching elements constituting the upper and lower arms for the three phases. The outputting of the pulse signals Su, Sv and Sw is controlled by providing dead times, in such a way as to prevent the semiconductor switching elements connected in series to each other in the upper and lower arms from being simultaneously turned on to cause short-circuiting.

Figure 7:
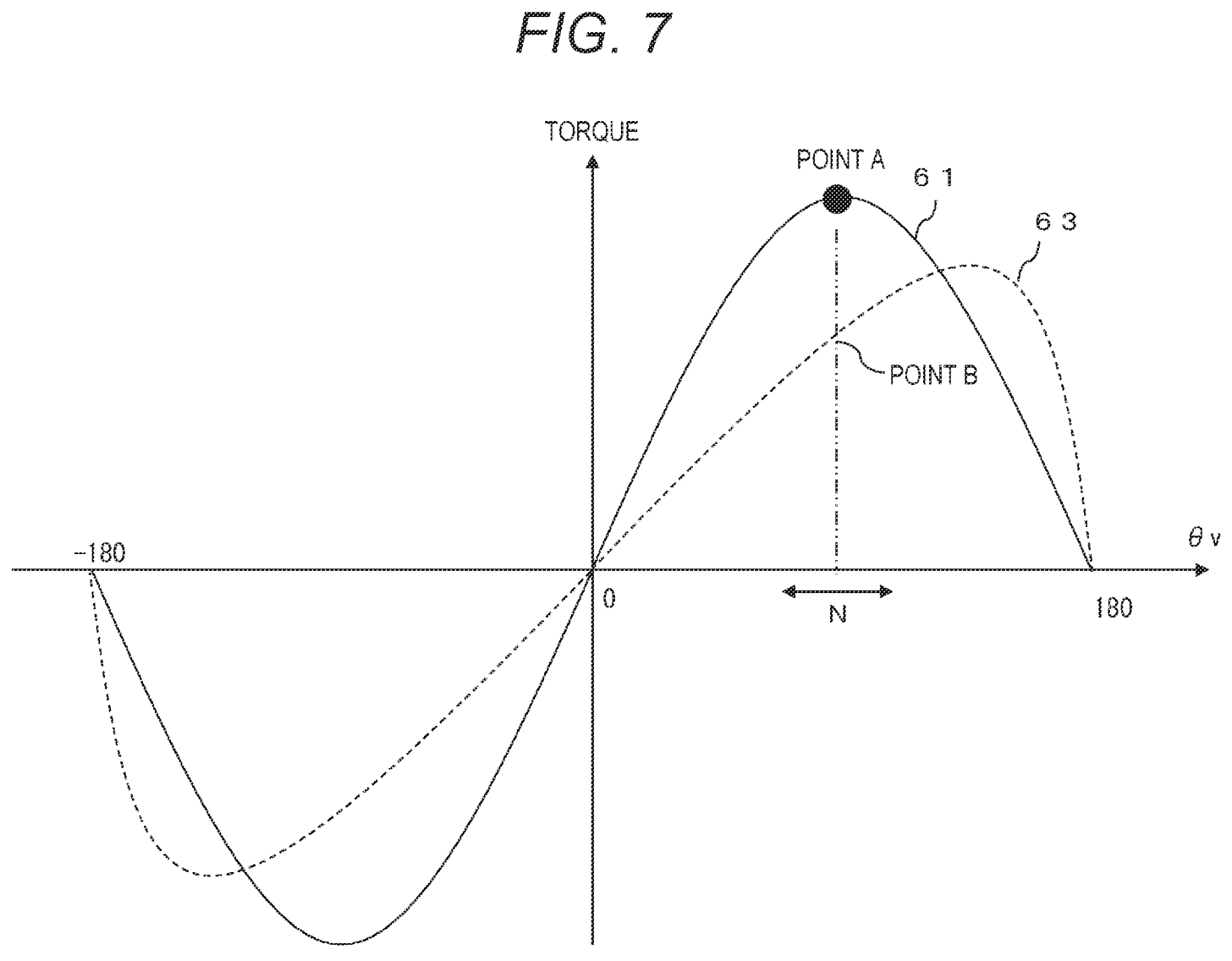

FIG. 7 is a graph illustrating the relationship between the voltage phase angle θv and the torque. The horizontal axis represents the voltage phase angle θv, while the vertical axis represents the torque.

In FIG. 7, a solid line illustrates a curve 61 indicating the relationship between the voltage phase angle θv and the torque outputted from the synchronous motor 1. Further, a broken line illustrates a curve 63 indicating the relationship between the voltage phase angle θv and the second torque T2.

As illustrated in FIG. 7, the torque T of the synchronous motor 1 is maximized at a point A. On the other hand, it can be seen that the second torque T2 gradually increases in a region N including the point A where the torque T of the synchronous motor 1 is maximized. Accordingly, by commanding the second torque T2 which gradually increases, through the second-torque command value T2*, it is possible to smoothly and accurately control the torque T at a point B corresponding to the point A of the torque T of the synchronous motor 1. Namely, it is possible to utilize the torque T without imposing a limit thereon, up to a maximum torque which can be outputted from the synchronous motor 1.

Figure 8:
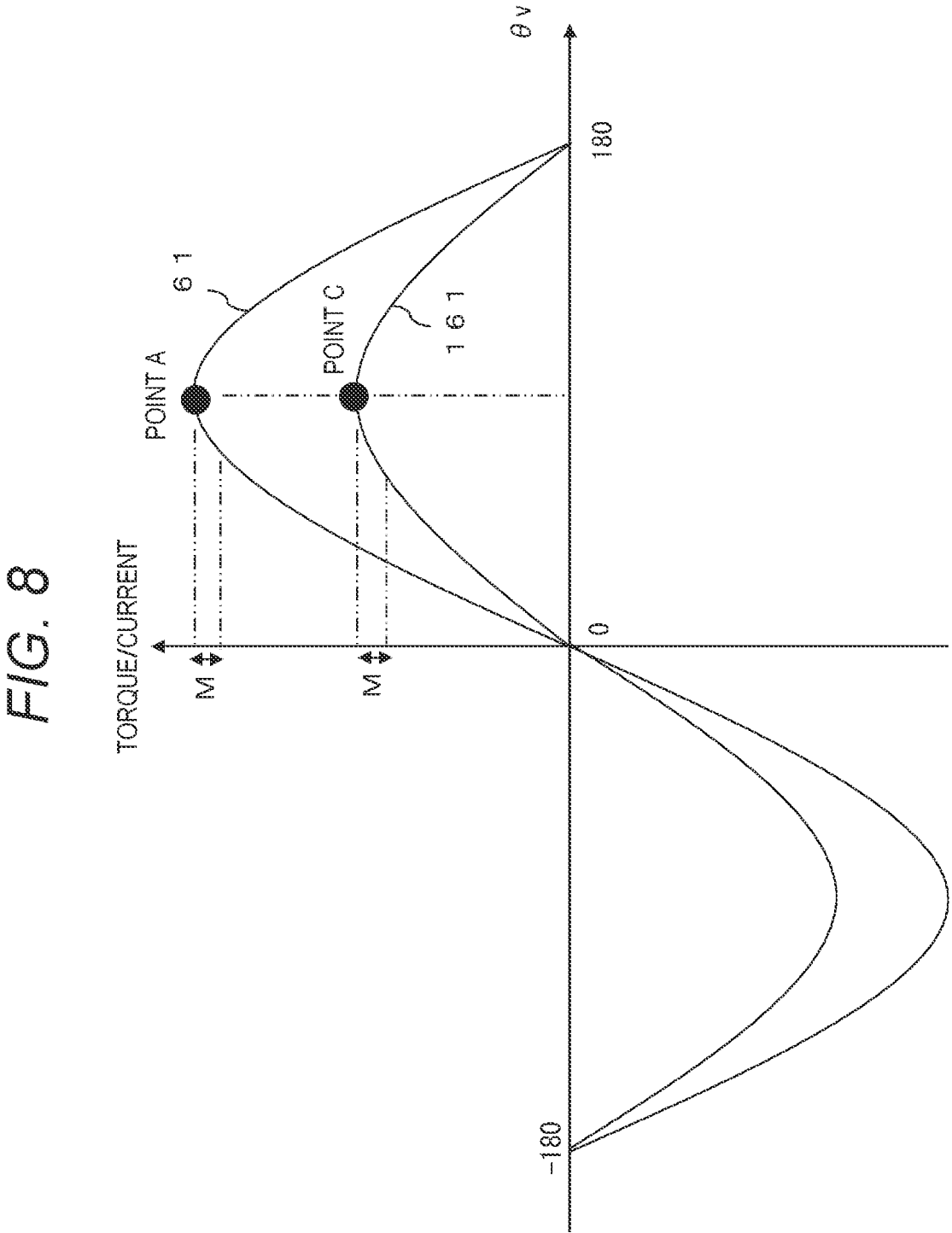
FIG. 8 is a graph illustrating the relationship between a voltage phase angle and torque in a comparative example.

FIG. 8 is a graph illustrating the relationship between the voltage phase angle θv and the torque in a comparative example. The horizontal axis represents the voltage phase angle θv, while the vertical axis represents the torque. This comparative example illustrates a case where the present embodiment is not applied, thereby illustrating a graph to be compared with the present embodiment.

In FIG. 8, a curve 61 represents the relationship between the voltage phase angle θv and the torque. In general, a motor is controlled in such a way as to impose a limit on the maximum torque of the motor, in order to prevent failures of the control. For example, if the torque command value is deviated by being influenced by a parameter error or the like, and the torque command value comes to be larger than the value at the point A corresponding to the maximum torque of the motor, the voltage phase angle θv becomes larger than the value at the point A, which decreases the torque of the motor, thereby inducing a failure of the control. For coping therewith, a margin M is provided with respect to the point A, in order to impose a limit on the torque command value (or the voltage phase angle θv) for preventing the torque command value from exceeding the margin M.

In FIG. 8, a curve 161 represents the relationship between the voltage phase angle θv and the q-axis current. A point C on the curve 161 is placed at the same position as that of the point A on the curve 61 or at a position where the voltage phase angle θv is smaller. If a q-axis current command value larger than the value at the point C is set, this induces a failure of the control similarly. For coping therewith, a margin M is provided with respect to the point C in order to impose a limit on the q-axis current command value (or the voltage phase angle θv). In this case, similarly, it is impossible to sufficiently exert the torque which can be inherently outputted from the motor.

On the other hand, in the present embodiment, as described with reference to FIG. 7 and the like, the control is performed using the second-torque command value T2* which gradually increases in the region N including the point A at which the torque T of the synchronous motor 1 is peaked, which makes it possible to utilize the torque which can be outputted from the synchronous motor 1 without imposing a limit thereon.

Figure 9:
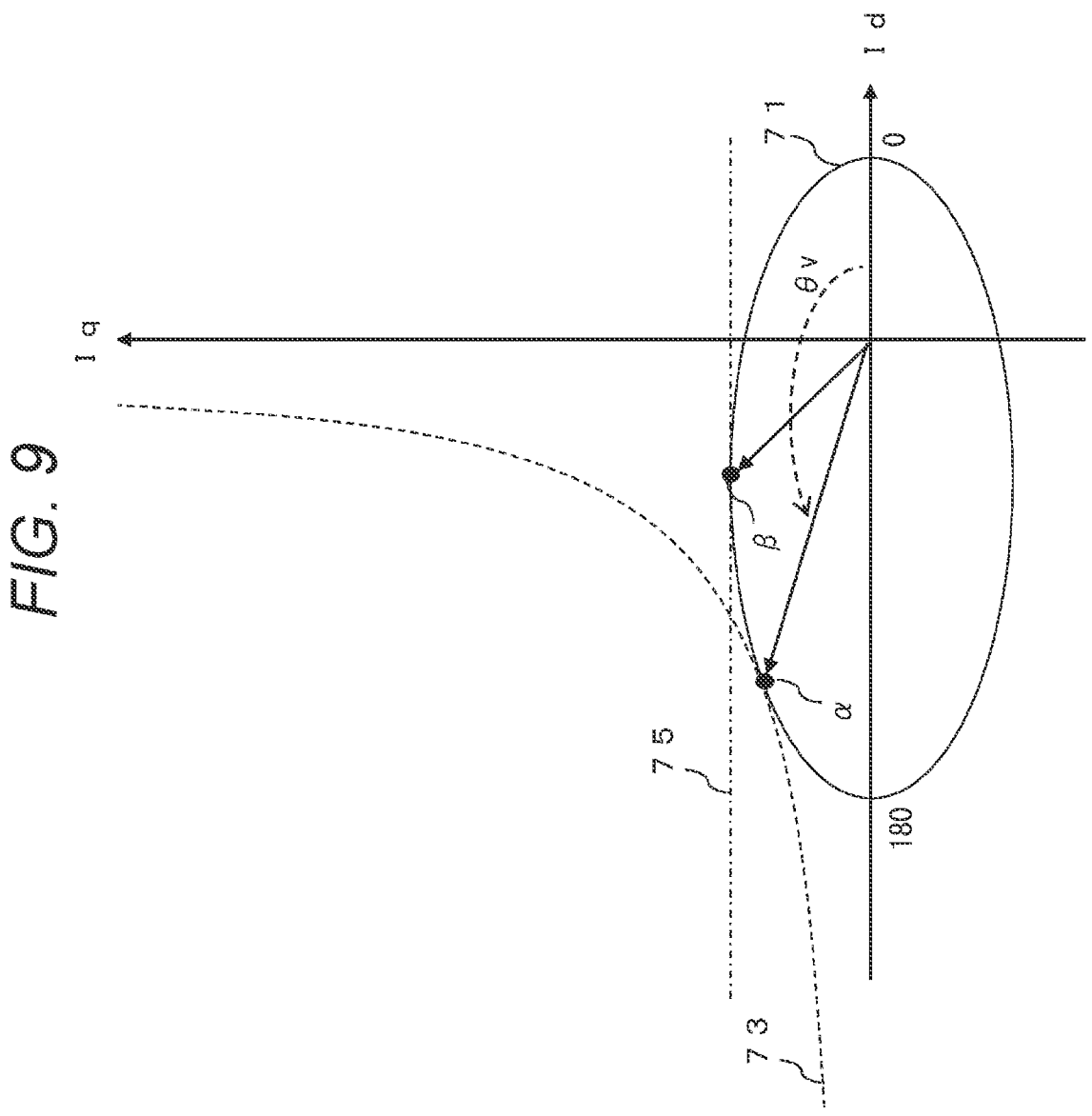
FIG. 9 is a graph illustrating a magnetic-flux constant closed curve and torque constant curves.

FIG. 9 is a graph illustrating a magnetic-flux constant closed curve 71 and torque constant curves 73 and 75. The horizontal axis of the graph represents the d-axis current Id, while the vertical axis represents the q-axis current Iq. With reference to FIG. 9, there will be described the reason why the reluctance torque is peaked at a position where the voltage phase angle θv is larger than at the position where the torque T of the synchronous motor 1 is peaked, when the reluctance torque is set as the second torque.

The magnetic-flux constant closed curve 71 illustrates a curve in which the linkage magnetic flux in the synchronous motor 1 is constant in the voltage phase control. If the resistance and the transient term are ignored, the torque moves on the magnetic-flux constant closed curve 71 during voltage phase control. In other words, the magnetic-flux constant closed curve 71 can also be rephrased as a curve in which the voltage value is constant, namely, a voltage constant closed curve 71. Further, on the voltage constant closed curve 71, the torque is controlled by the voltage phase angle θv of the current command value specified by the d-axis current Id and the q-axis current Iq.

The torque constant curve 73 of the reluctance torque represents a curve in which the reluctance torque is constant when the reluctance torque is peaked. The torque constant line 75 of the magnet torque represents a line in which the magnet torque is constant when the magnet torque is peaked.

As illustrated in FIG. 9, the torque constant curve 73 of the reluctance torque contacts the magnetic-flux constant closed curve 71 at a point α where the voltage phase angle θv advances more than at a point β at which the torque constant line 75 of the magnet torque contacts the magnetic-flux constant closed curve 71. Here, since the second torque is proportional to the d-axis current command value Id* and the q-axis current command value Iq*, the second torque forms a component proportional to the reluctance torque, if magnetic saturation is ignored (magnetic saturation is considered in a third modification example illustrated in FIG. 12 which will be described later). On the other hand, the torque corresponds to the sum of the reluctance torque and the magnet torque. Namely, the voltage phase angle θv which makes the torque be peaked exists between the peak of the magnet torque and the peak of the reluctance torque. Therefore, as described with reference to FIG. 7, the second torque always gradually increases at the point A where the torque is peaked.

Further, in the present embodiment, the current command creation unit 21 creates the d-axis current command value Id* and the q-axis current command value Iq*, based on the torque command value T*, the speed ω1*, and the DC voltage Vdc, such that the torque exists on the voltage constant closed curve 71. Accordingly, when any one of the d-axis current, the q-axis current, and the torque (including the magnet torque and the reluctance torque) calculated using the d-axis current and the q-axis current matches a point (torque) on the voltage constant closed curve 71, it is possible to control the torque through the d-axis current command value Id* and the q-axis current command value Iq*. Therefore, by controlling the second torque rather than directly controlling the torque command value T*, for example, it is possible to control the torque as a result.

In the present embodiment, since the torque proportional to the reluctance torque gradually increases at the point A illustrated in FIG. 7, even if the current command value is deviated due to a parameter error or the like to make the reluctance-torque command value (the second-torque command value T2*) larger than the reluctance-torque command value (the second-torque command value T2*) at the point A, it is possible to perform the control without inducing a failure. This eliminates the necessity of imposing a limit on the torque command value with a margin provided therefor, which enables increasing the maximum torque in the voltage phase control. Further, in the present embodiment, there has been described an example where the torque proportional to the reluctance torque is used as the second-torque command value T2*. However, it is also possible to use, as the second-torque command value T2*, a value which gradually increases in the region N including the peak of the torque T of the synchronous motor 1, as well as the reluctance torque.

Further, although there has been described an example where the rectangular-wave generation unit 15 outputs rectangular-wave pulses through one-pulse control, it is also possible to provide similar effects, for example, in cases where the voltage approaches an output limit as in cases of three-pulse control, and the torque is controlled through voltage phase control.

Figure 10:
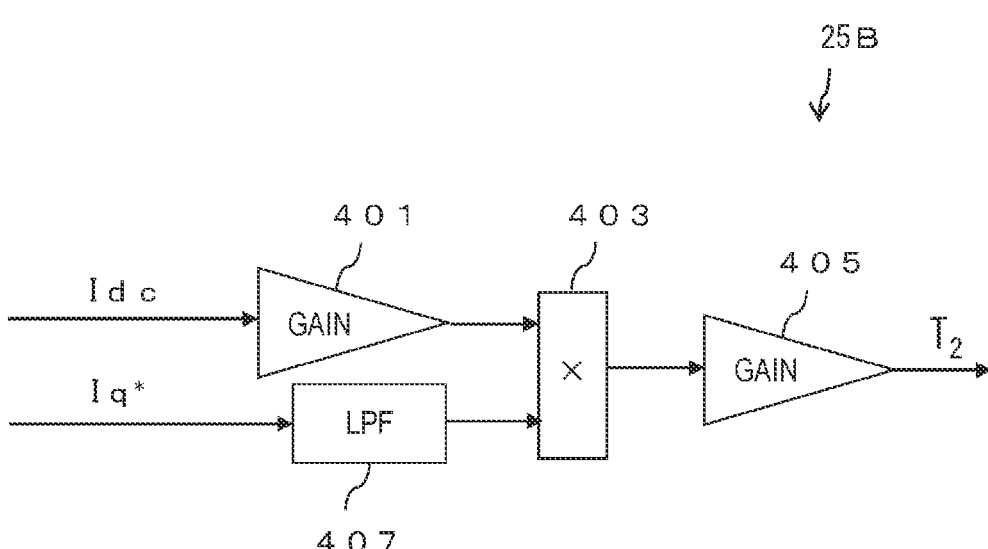
FIG. 10 is a structural block diagram of a second-torque calculation unit in a first modification example.

FIG. 10 is a structural block diagram of a second-torque calculation unit 25B in a first modification example.

As illustrated in FIG. 5, the second-torque calculation unit 25B multiplies the d-axis current detected value Idc by a fifth gain 401 and inputs the result of this multiplication to one side of a multipliers 403. Instead of the q-axis current detected value Iqc in FIG. 4, the q-axis current command value Iq* is inputted to the other side of the multipliers 403 after being passed through a low-pass filter (LPF) 407. The result of the multiplication between both the values by the multiplier 403 is multiplied by a sixth gain 405, and the result of this multiplication is outputted as the second torque T2.

The q-axis current detected value Iqc has a delay corresponding to the response related to the current control, from the torque command value T*. However, in the first modification example, instead of the q-axis current detected value Iqc, the q-axis current command value Iq* passed through the low-pass filter (LPF) 407 is adopted, which can avoid the delay corresponding to the response and also can stabilize the control.

Figure 11:
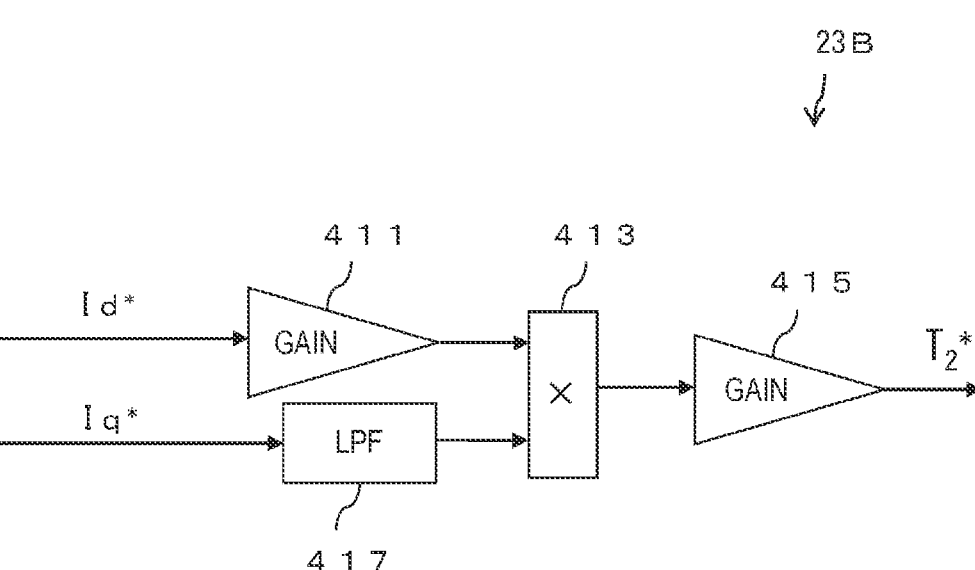
FIG. 11 is a structural block diagram of a second-torque command value calculation unit in a second modification example.

FIG. 11 is a structural block diagram of a second-torque command value calculation unit 23B in a second modification example.

In a case of using the second-torque calculation unit 25B in the first modification example illustrated in FIG. 10, the second-torque command value calculation unit 23 may have the structure illustrated in FIG. 3 or may be the second-torque command value calculation unit 23B described in the second modification example which will be described hereinafter.

As illustrated in FIG. 11, the second-torque command value calculation unit 23B multiplies the d-axis current command value Id* by a seventh gain 411 and inputs the result of this multiplication to one side of a multipliers 413. Further, the q-axis current command value Iq* is inputted to the other side of the multipliers 413 after being passed through a low-pass filter (LPF) 417. The result of the multiplication between both the values by the multiplier 413 is multiplied by an eighth gain 415, and the result of this multiplication is outputted as the second-torque command value T2*.

Figure 12:
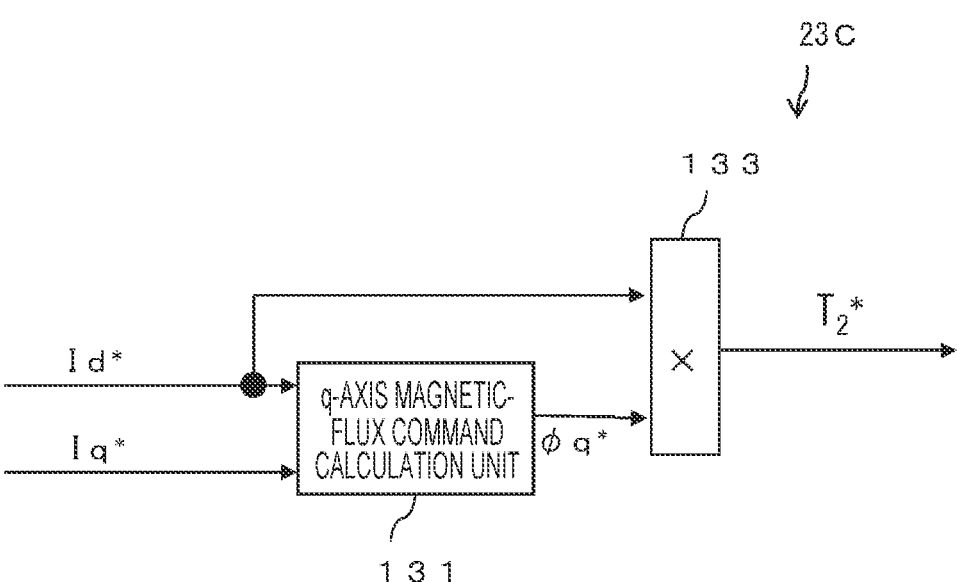
FIG. 12 is a structural block diagram of a second-torque command value calculation unit in a third modification example.

FIG. 12 is a structural block diagram of a second-torque command value calculation unit 23C in a third modification example.

As illustrated in FIG. 12, in the second-torque command value calculation unit 23C, a q-axis magnetic-flux command calculation unit 131 calculates a q-axis magnetic-flux command value φq*, based on the d-axis current command value Id* and the q-axis current command value Iq*, by using a lookup table or by approximation with a mathematical expression, for example. Then, the d-axis current command value Id* is multiplied by the q-axis magnetic-flux command value φq* by a multiplier 133, and the result of this multiplication is outputted as the second-torque command value T2*. When magnetic saturation is ignored, the q-axis magnetic flux is proportional to the q-axis current. Therefore, the same effects as those of the first embodiment can be provided.

Figure 13:
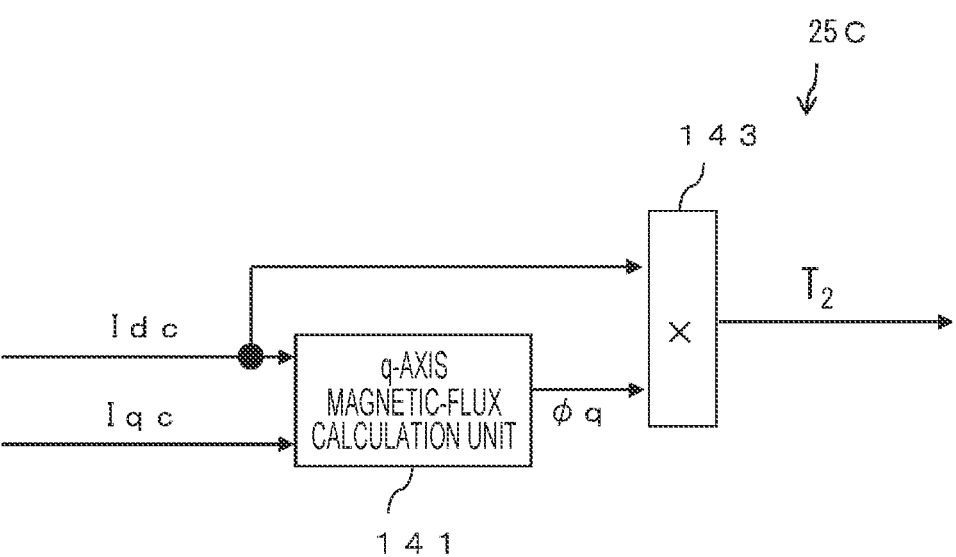
FIG. 13 is a structural block diagram of a second-torque calculation unit in a fourth modification example.

FIG. 13 is a structural block diagram of a second-torque calculation unit 25C in a fourth modification example. In a case of using the second-torque command value calculation unit 23C in the third modification example illustrated in FIG. 12, the second-torque calculation unit 25C in the fourth modification example is preferably used as the second-torque calculation unit 25.

As illustrated in FIG. 13, in the second-torque calculation unit 25C, a q-axis magnetic-flux calculation unit 141 calculates a q-axis magnetic flux φq, based on the d-axis current detected value Idc and the q-axis current detected value Iqc, by using a lookup table or by approximation with a mathematical expression, for example. Then, the d-axis current detected value Idc is multiplied by the q-axis magnetic flux φq by a multiplier 143, and the result of this multiplication is outputted as the second torque T2. As described above, the second-torque command value calculation unit 23C and the second-torque calculation unit 25C may preferably use the same arithmetic expression.

Figure 14:
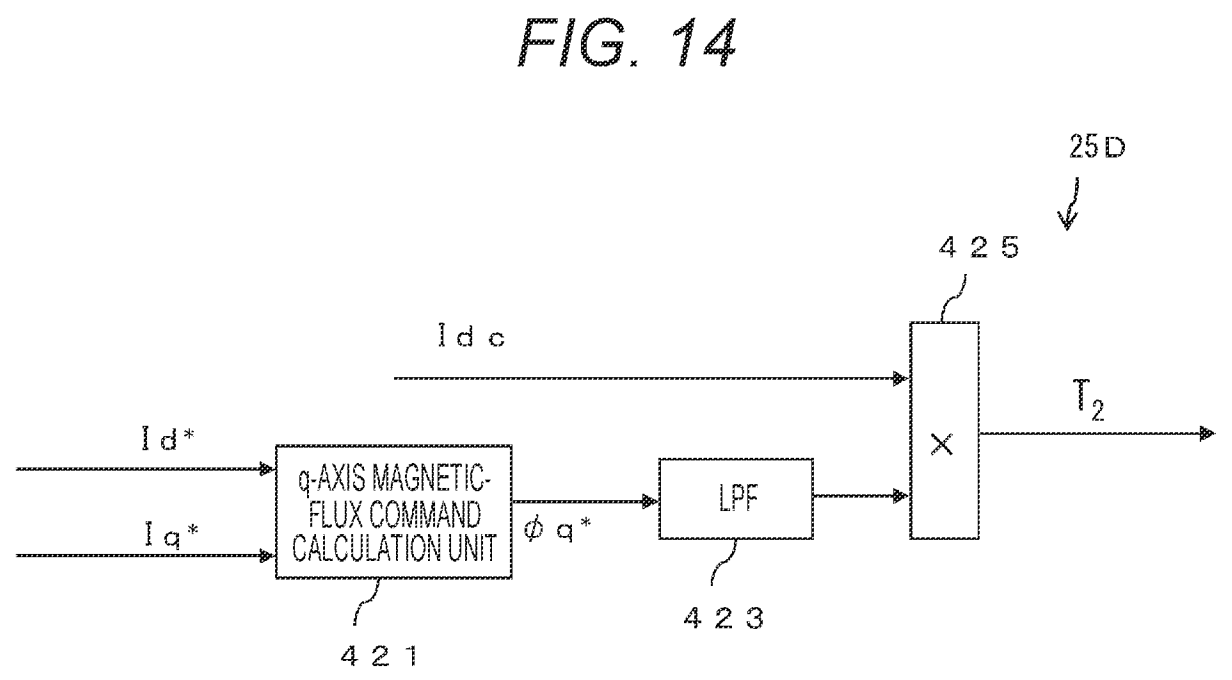

FIG. 14 is a structural block diagram of a second-torque calculation unit 25D in a fifth modification example.

As illustrated in FIG. 14, in the second-torque calculation unit 25D, a q-axis magnetic-flux command calculation unit 421 calculates a q-axis magnetic-flux command value φq*, based on the d-axis current command value Id* and the q-axis current command value Iq*, by using a lookup table or by approximation with a mathematical expression, for example. Further, the q-axis magnetic-flux command value φq* is passed through a low-pass filter (LPF) 423 and then is outputted to a multiplier 425. Then, the q-axis magnetic-flux command value φq* is multiplied by the d-axis current detected value Idc by the multiplier 425, and the result of this multiplication is outputted as the second torque T2.

In the fourth modification example illustrated in FIG. 13, the q-axis magnetic flux φq is used. However, the q-axis magnetic flux φq has a delay corresponding to the response related to the current control, with respect to the torque command value T*. In the fifth modification example, instead of the q-axis magnetic flux φq, the q-axis magnetic-flux command value φq* passed through the low-pass filter (LPF) 423 is adopted, which can avoid the delay corresponding to the response and also can stabilize the control.

Figure 15:
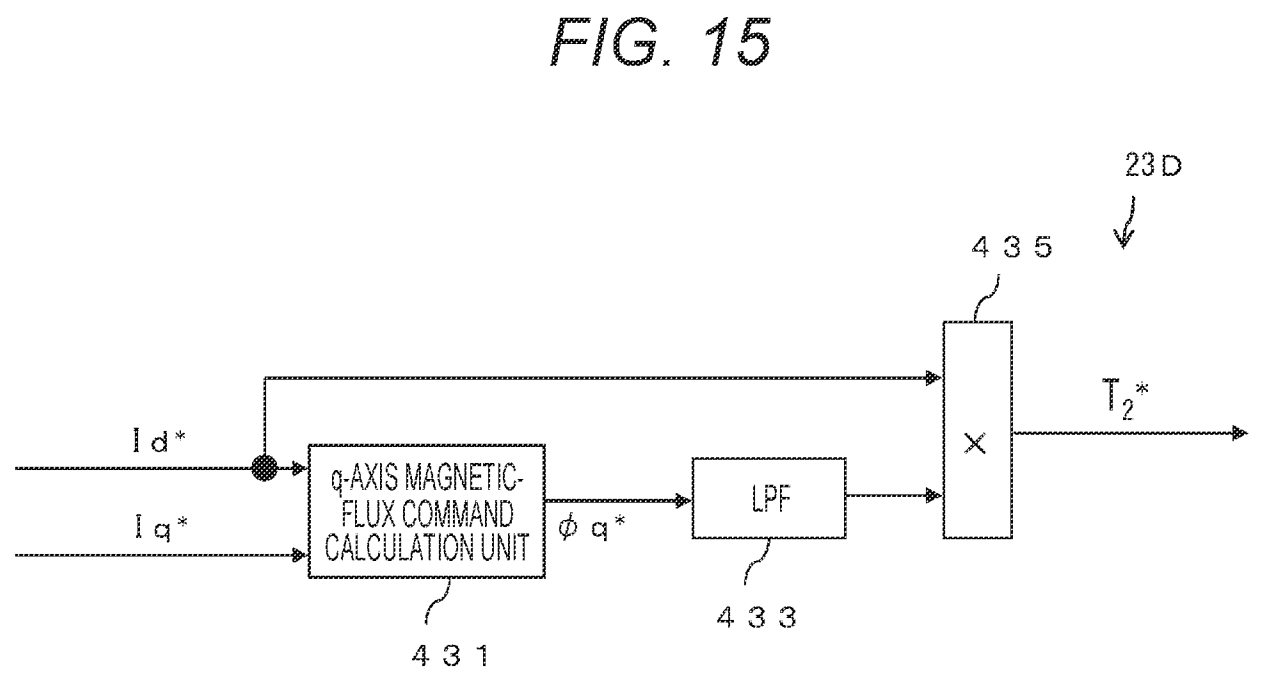

FIG. 15 is a structural block diagram of a second-torque command value calculation unit 23D in a sixth modification example.

In a case of using the second-torque calculation unit 25D in the fifth modification example illustrated in FIG. 14, the second-torque command value calculation unit 23C in the third modification example illustrated in FIG. 12 may be used, or the second-torque command value calculation unit 23D in the sixth modification example illustrated in FIG. 15 may be used, as the second-torque command value calculation unit 23.

As illustrated in FIG. 15, in the second-torque command value calculation unit 23D, a q-axis magnetic-flux command calculation unit 431 calculates a q-axis magnetic-flux command value φq*, based on the d-axis current command value Id* and the q-axis current command value Iq*, by using a lookup table or by approximation with a mathematical expression, for example. Further, the q-axis magnetic-flux command value φq* is passed through a low-pass filter (LPF) 433 and then is outputted to a multiplier 435. Then, the d-axis current command value Id* is multiplied by the q-axis magnetic-flux command value φq* by the multiplier 435, and the result of this multiplication is outputted as the second-torque command value T2*.

Figure 16:
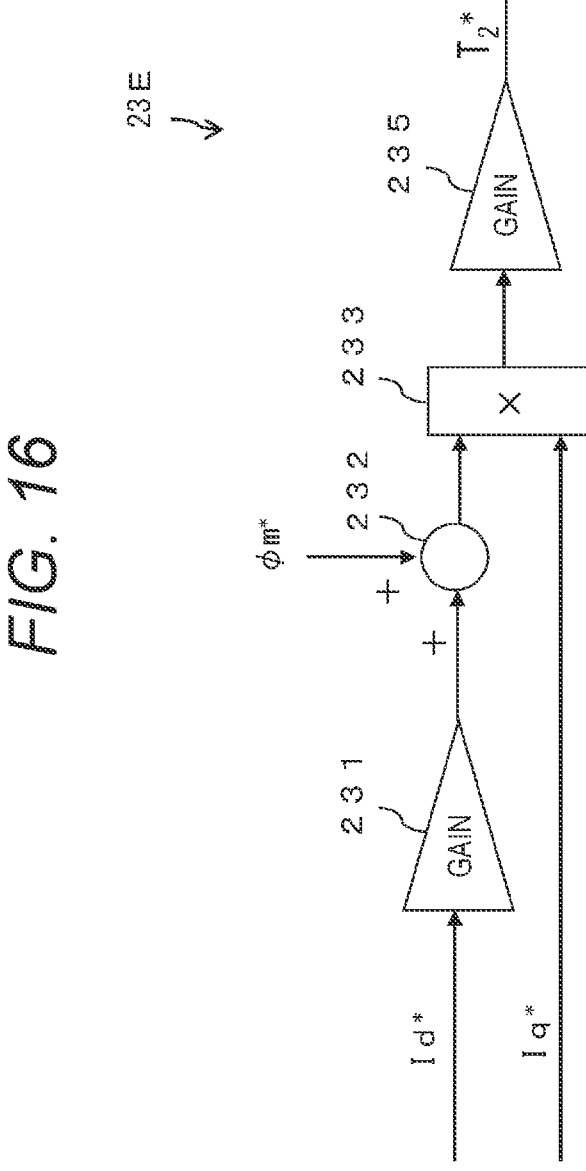
FIG. 16 is a structural block diagram of a second-torque command value calculation unit in a seventh modification example.

FIG. 16 is a structural block diagram of a second-torque command value calculation unit 23E in a seventh modification example.

As illustrated in FIG. 16, the second-torque command value calculation unit 23E multiplies the d-axis current command value Id* by a first gain 231, further adds up the result of this multiplication and a magnet magnetic-flux coefficient φm* by an adder 232 and inputs the result of this addition to one side of a multipliers 233. In the multiplier 233, the value inputted to the one side thereof is multiplied by the q-axis current command value Iq* inputted to the other side thereof. The result of this multiplication is further multiplied by a second gain 235. In this way, the second-torque command value T2* is determined.

By setting the magnet magnetic-flux coefficient φm* smaller than the actual value, the proportion of the magnet torque in the torque decreases, and the reluctance torque becomes dominant in the second-torque command value T2*. Namely, the second-torque command value T2* is proportional to the reluctance torque. In this case, similarly, the voltage phase angle at the peak of the second-torque command value T2 is larger than the voltage phase angle at that of the torque T of the synchronous motor 1, which enables provision of the same effects as those of the first embodiment.

Figure 17:
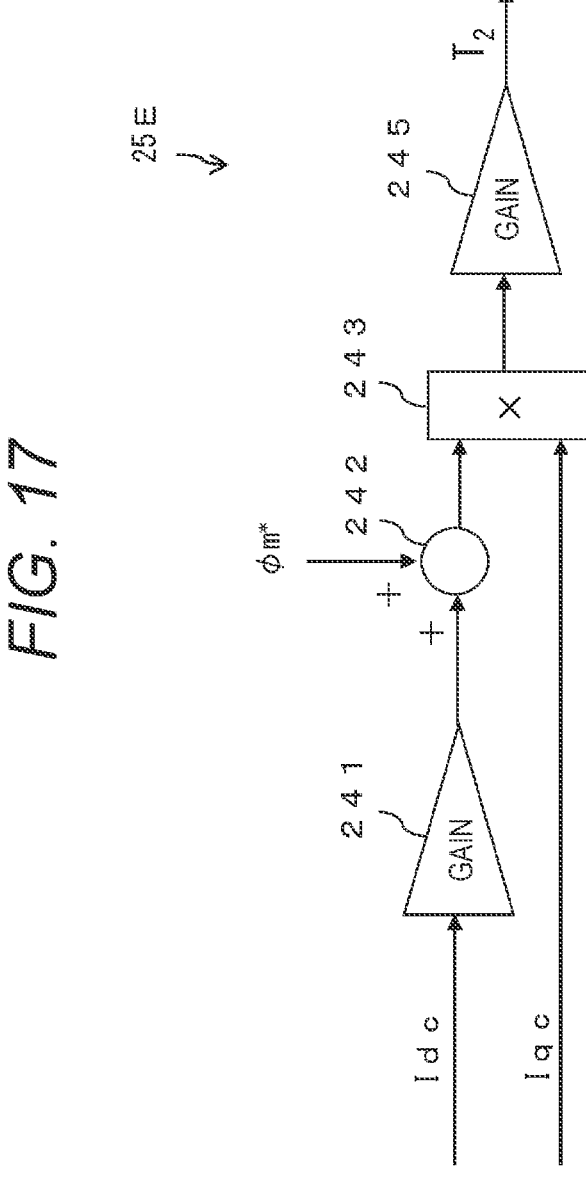
FIG. 17 is a structural block diagram of a second-torque calculation unit in an eighth modification example.

FIG. 17 is a structural block diagram of a second-torque calculation unit 25E in an eighth modification example. In a case of using the second-torque command value calculation unit 23E in the seventh modification example illustrated in FIG. 16, the second-torque calculation unit 25E in the eighth modification example illustrated in FIG. 17 is used as the second-torque calculation unit 25.

As illustrated in FIG. 17, the second-torque calculation unit 25E multiplies the d-axis current detected value Idc by a third gain 241, further adds up the result of this multiplication and the magnet magnetic-flux coefficient φm* by an adder 242 and inputs the result of this addition to one side of a multipliers 243. In the multiplier 243, the value inputted to the one side thereof is multiplied by the q-axis current detected value Iqc inputted to the other side thereof. The result of this multiplication is further multiplied by a second gain 245. In this way, the second torque T2 is determined.

By setting the magnet magnetic-flux coefficient φm* smaller than the actual value, the proportion of the magnet torque in the torque decreases, and the reluctance torque becomes dominant in the second torque T2.

Second Embodiment

Figure 18:
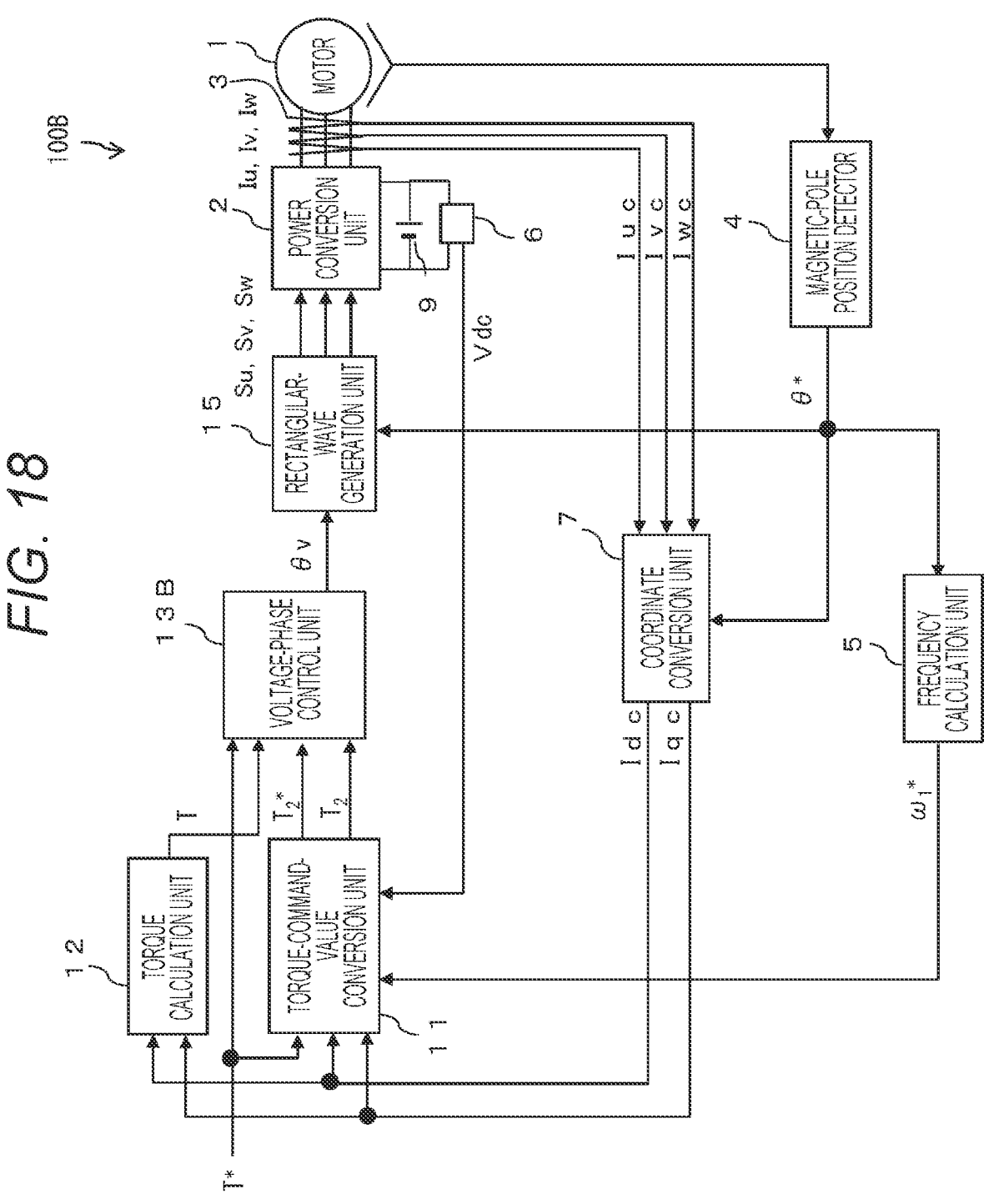
FIG. 18 is a structural block diagram of a synchronous-motor control device according to a second embodiment.

FIG. 18 is a structural block diagram of a synchronous-motor control device 100B according to a second embodiment. The second embodiment is different from the first embodiment in that a torque calculation unit 12 is additionally provided. The same portions as those of the synchronous-motor control device 100 according to the first embodiment illustrated in FIG. 1 will be denoted by the same reference numerals, and will not be described.

The torque calculation unit 12 calculates the torque T of a synchronous motor 1, based on a d-axis current detected value Idc and a q-axis current detected value Iqc. The torque calculation unit 12 will be described in detail later with reference to FIG. 19.

A voltage-phase control unit 13B uses a torque command value T* until the torque T of the synchronous motor 1 or the torque command value T* reaches a certain value, while the voltage-phase control unit 13B uses a second-torque command value T2* when the torque T of the synchronous motor 1 or the torque command value T* is equal to or greater than the certain value, in order to control and output a voltage phase angle θv such that the torque command value T* or the second-torque command value T2* matches the torque T of the synchronous motor 1. The voltage-phase control unit 13B will be described in detail later with reference to FIG. 20.

Figure 19:
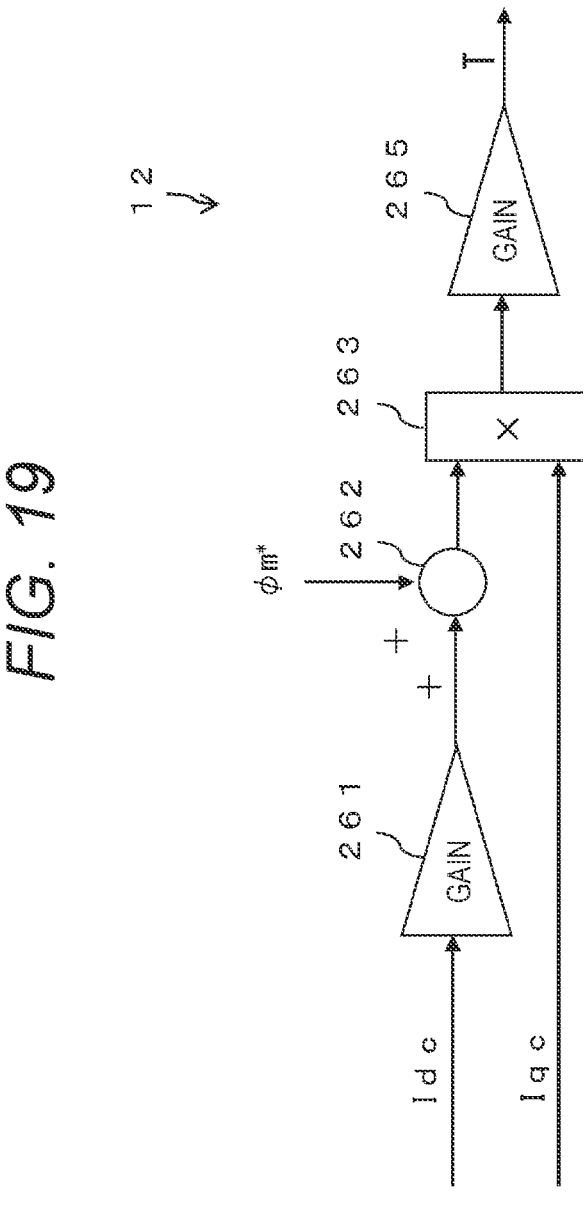
FIG. 19 is a structural block diagram of a torque calculation unit according to the second embodiment.

FIG. 19 is a structural block diagram of the torque calculation unit 12.

As illustrated in FIG. 19, the torque calculation unit 12 multiplies the d-axis current detected value Idc by a ninth gain 261, further adds up the result of this multiplication and a magnet magnetic-flux coefficient φm* by an adder 262 and inputs the result of this addition to one side of a multipliers 263. In the multiplier 263, the value inputted to the one side thereof is multiplied by the q-axis current detected value Iqc inputted to the other side thereof. The result of this multiplication is further multiplied by a tenth gain 265. In this way, the torque T is determined. The torque T of the synchronous motor 1 may be also determined by other means such as a torque sensor.

Figure 20:
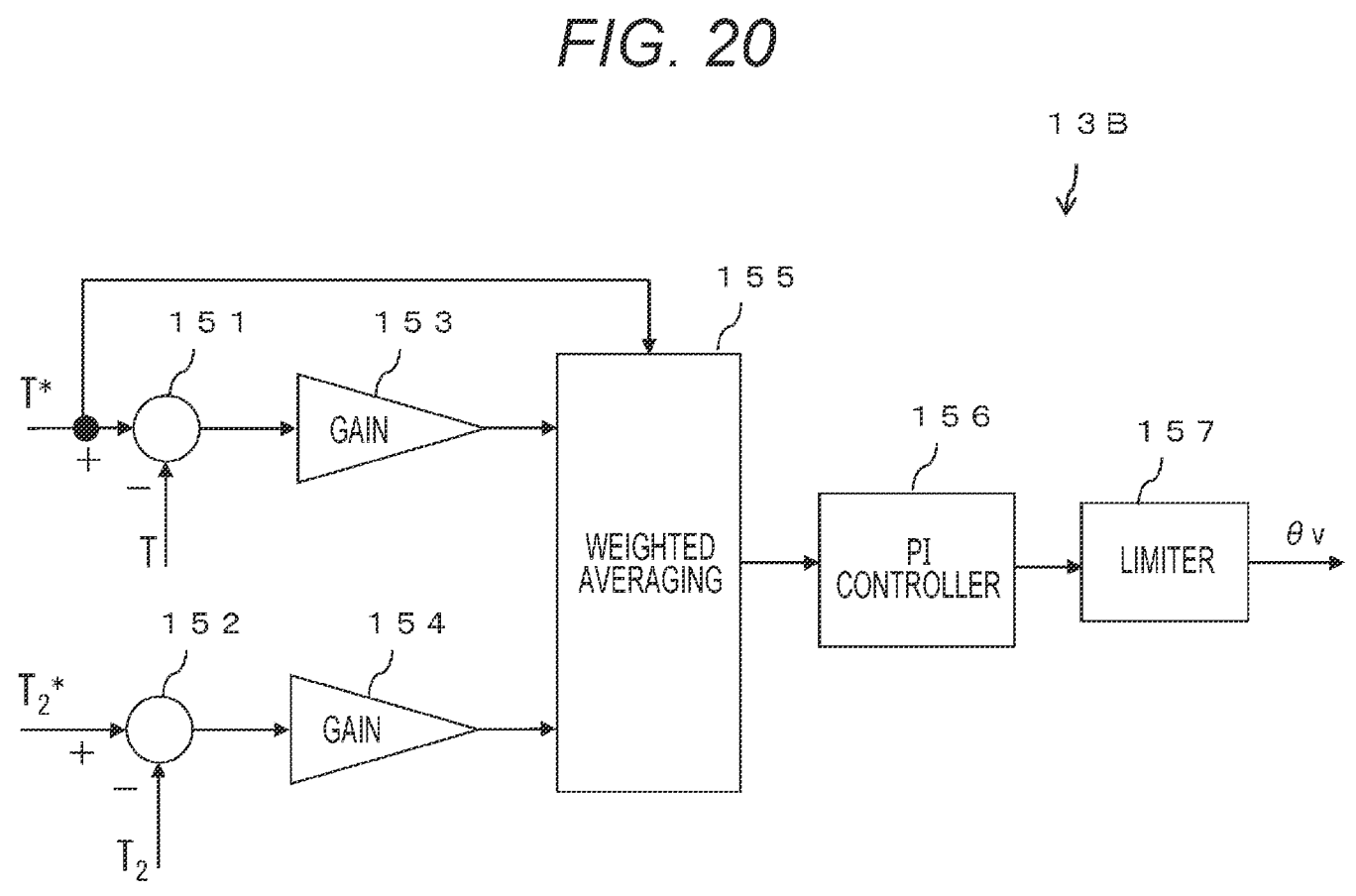

FIG. 20 is a structural block diagram of the voltage-phase control unit 13B.

As illustrated in FIG. 20, the voltage-phase control unit 13B calculates the difference between the torque T and the torque command value T* by a differentiator 151, further multiplies the difference by an eleventh gain 153, and inputs the result of this multiplication to one side of a weighted averaging device 155. Further, the voltage-phase control unit 13B calculates the difference between the second torque T2 and the second-torque command value T2* by a differentiator 152, further multiplies the difference by a twelfth gain 154, and inputs the result of this multiplication to the other side of the weighted averaging device 155. The torque command value T* as a reference is inputted to the weighted averaging device 155, and the weighted averaging device 155 outputs the difference between the torque T and the torque command value T* when the torque command value T* is smaller than a predetermined value.

The weighted averaging device 155 outputs the difference between second torque T2 and second-torque command value T2* when the torque command value T* is equal to or greater than the predetermined value. The output from the weighted averaging device 155 is inputted to a PI controller 156 (or an I controller), then is passed through the PI controller 156 (or the I controller) and, then, is subjected to limiting processing by a limiter 157 to fall within such a range that the torque does not exceed the peak. As a result, the voltage phase angle θv is outputted. Incidentally, instead of the torque command value T*, as a reference, the torque T may be inputted to the weighted averaging device 155, and the weighted averaging device 155 may output the difference between the torque T and the torque command value T* when the torque T is smaller than a predetermined value, while the weighted averaging device 155 may output the difference between the second torque T2 and the second-torque command value T2* when the torque T is equal to or greater than the predetermined value.

In the present embodiment, when the torque T of the synchronous motor 1 or the torque command value T* is equal to or greater than the predetermined value, the voltage phase angle θv is controlled such that the second-torque command value T2* matches the torque T of the synchronous motor 1. Accordingly, when the torque T or the torque command value T* is smaller, the torque T is changed by a larger amount with respect to the voltage phase angle θv and, therefore, the synchronous motor 1 can be stably operated by performing the control through the torque T rather than through the proportional change of the reluctance torque. On the other hand, when the torque T or the torque command value T* has come to be larger, the reluctance torque changes proportionally by a larger amount. Therefore, the synchronous motor 1 can be operated stably. By changing over the control according to the magnitude of the torque T or the torque command value T* as described above, it is possible to stably operate the synchronous motor 1.

In the present embodiment, the weighted average is performed according to the torque T or the torque command value T*. However, another variable may be used provided that the relationship between this variable and the torque T or the torque command value T* has been determined. For example, the d-axis current, the q-axis current, the d-axis magnetic flux, the q-axis magnetic flux, the voltage phase angle, or the like may be used as a variable which changes depending on the torque T or the torque command value T*.

Figure 21:
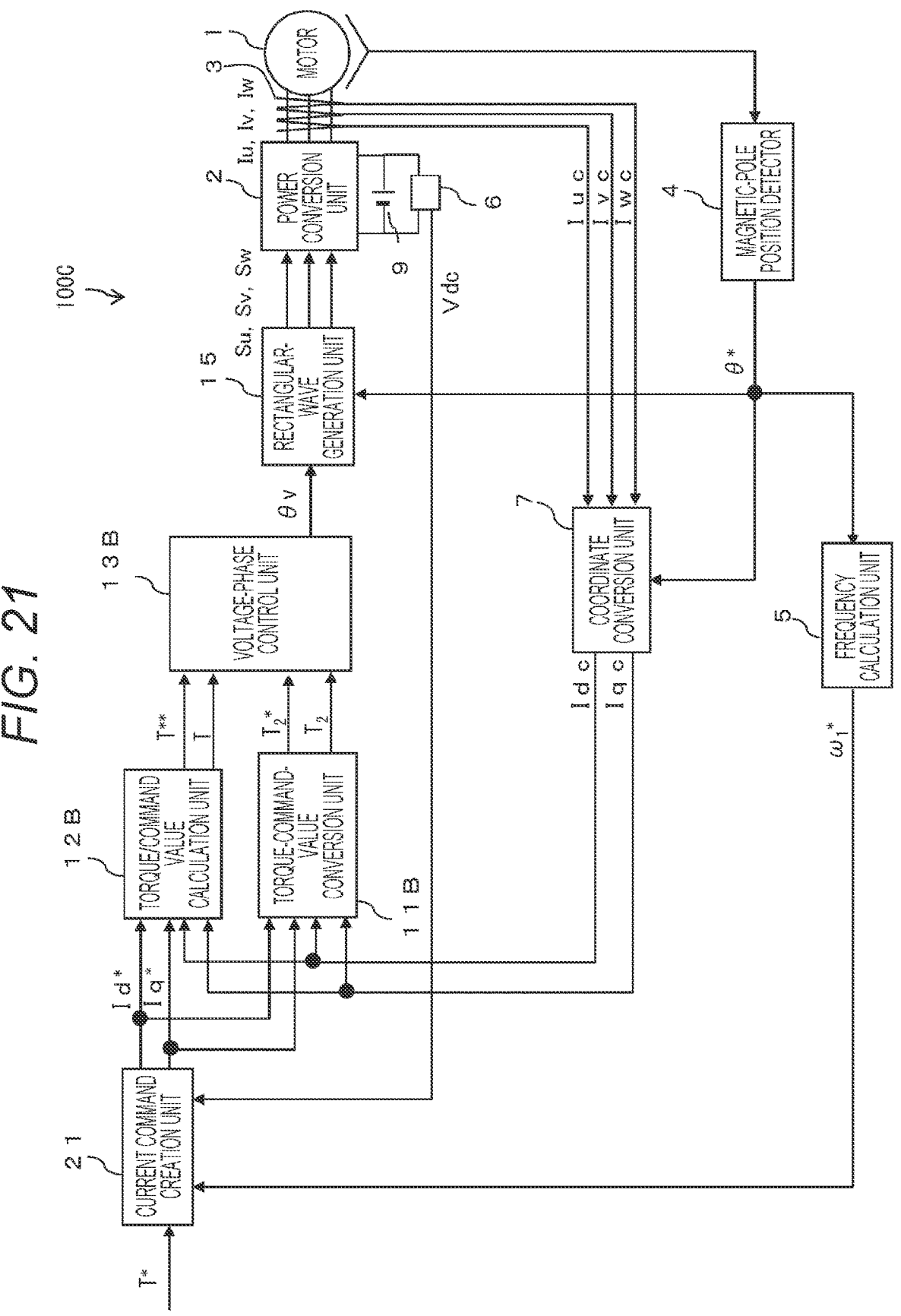
FIG. 21 is a structural block diagram of a synchronous-motor control device in a ninth modification example according to the second embodiment.

FIG. 21 is a structural block diagram of a synchronous-motor control device 100C in a ninth modification example according to the second embodiment. The ninth modification example is different from the second embodiment in that a current command creation unit 21 and a torque/command value calculation unit 12B are provided. The same portions as those of the synchronous-motor control device 100 according to the first embodiment illustrated in FIG. 1 will be denoted by the same reference numerals, and will not be described.

The current command creation unit 21 creates a d-axis current command value Id* and a q-axis current command value Iq* using, for example, a lookup table or the like, based on a torque command value T*, a DC voltage Vdc, and a speed information ω1*. The d-axis current command value Id* and q-axis current command value Iq* which have been created thereby are inputted to the torque/command value calculation unit 12B and a torque-command-value conversion unit 11B.

The torque/command value calculation unit 12B calculates a torque command value T** based on the d-axis current command value Id* and the q-axis current command value Iq*, and also calculates a torque T based on a d-axis current detected value Idc and a q-axis current detected value Iqc. Further, the torque/command value calculation unit 12B outputs them to a voltage-phase control unit 13B.

The torque-command-value conversion unit 11B calculates a second-torque command value T2* based on the d-axis current command value Id* and the q-axis current command value Iq*, and also calculates a second torque T2 based on the d-axis current detected value Idc and the q-axis current detected value Iqc. Further, the torque-command-value conversion unit 11B outputs them to the voltage-phase control unit 13B. The voltage-phase control unit 13B uses the torque command value T**, instead of the torque command value T* which has been described with reference to FIG. 20.

In the ninth modification example, the current command creation unit 21 once calculates the d-axis current command value Id* and the q-axis current command value Iq*, and the torque/command value calculation unit 12B calculates the torque command value T** and the torque T again from the d-axis current command value Id* and the q-axis current command value Iq*, for performing the control, which provides an effect of cancelling errors in the current command values.

Third Embodiment

Figure 22:
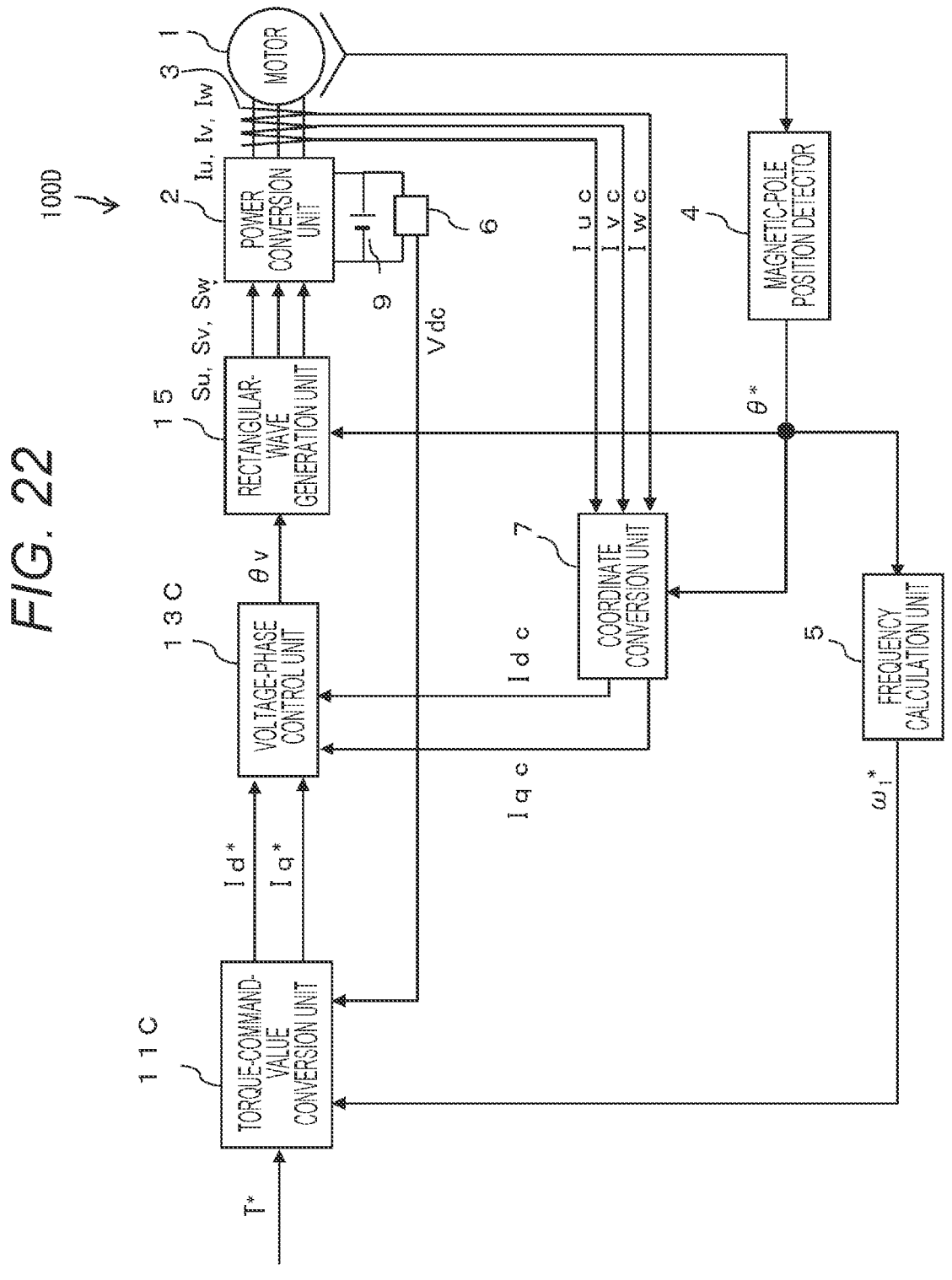
FIG. 22 is a structural block diagram of a synchronous-motor control device according to a third embodiment.

FIG. 22 is a structural block diagram of a synchronous-motor control device 100D according to a third embodiment. In the third embodiment, a d-axis current command value Id* is used as a second-torque command value T2*. The same portions as those of the synchronous-motor control device 100 according to the first embodiment illustrated in FIG. 1 will be denoted by the same reference numerals, and will not be described.

The torque-command-value conversion unit 11C has the same structure as that of the current command creation unit 21 illustrated in FIG. 2. The torque-command-value conversion unit 11C receives a torque command value T*, a DC voltage Vdc, and speed information ω1*, and creates a d-axis current command value Id* as a second-torque command value and further creates a q-axis current command value Iq* using, for example, a lookup table or the like.

The voltage-phase control unit 13C controls and outputs a voltage phase angle θv of a synchronous motor 1, using the q-axis current command value Iq* until the q-axis current command value Iq* or the q-axis current detected value Iqc reaches a certain value, and using the d-axis current command value Id* when the q-axis current command value Iq* or the q-axis current detected value Iqc is equal to or greater than a predetermined value. The predetermined value is, for example, a boundary value of a region N (see FIG. 24) including a point A at which the torque T of the synchronous motor 1 is maximized. The voltage-phase control unit 13C will be described in detail later with reference to FIG. 23.

Figure 23:
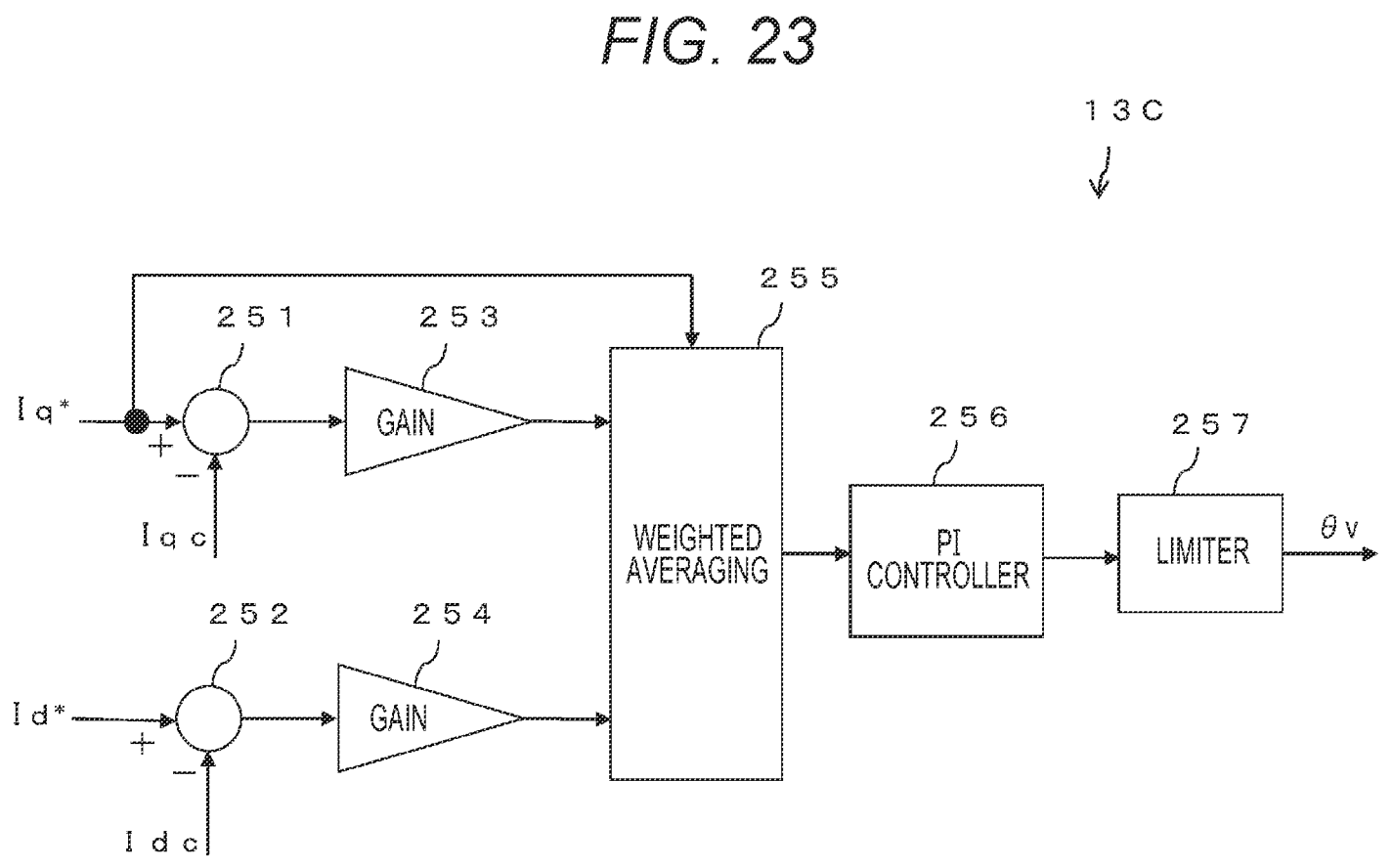

FIG. 23 is a structural block diagram of the voltage-phase control unit 13C.

As illustrated in FIG. 23, the voltage-phase control unit 13C calculates the difference between the q-axis current command value Iq* and the q-axis current detected value Iqc by a differentiator 251, further multiplies the difference by a thirteenth gain 253, and inputs the result of this multiplication to one side of a weighted averaging device 255. Further, the voltage-phase control unit 13C calculates the difference between the d-axis current command value Id* and the d-axis current detected value Idc by a differentiator 252, further multiplies the difference by a fourteenth gain 254, and inputs the result of this multiplication to the other side of the weighted averaging device 255. The q-axis current command value Iq* as a reference is inputted to the weighted averaging device 255, and the weighted averaging device 255 outputs the difference between the q-axis current command value Iq* and the q-axis current detected value Iqc when the q-axis current command value Iq* is smaller than the predetermined value.

The weighted averaging device 255 outputs the difference between the d-axis current command value Id* and the d-axis current detected value Idc when the q-axis current command value Iq* is equal to or greater than the predetermined value. The output from the weighted averaging device 255 is inputted to a PI controller 256 (or an I controller), then is passed through the PI controller 256 (or the I controller) and, then, is subjected to limiting processing by a limiter 257 to fall within such a range that the torque does not exceed the peak. As a result, the voltage phase angle θv is outputted. Also, instead of the q-axis current command value Iq*, as a reference, the q-axis current detected value Iqc may be inputted to the weighted averaging device 155, and the weighted averaging device 155 may output the difference between the q-axis current command value Iq* and the q-axis current detected value Iqc when the q-axis current detected value Iqc is smaller than a predetermined value, while the weighted averaging device 155 may output the difference between the d-axis current command value Id* and the d-axis current detected value Idc when the q-axis current detected value Iqc is equal to or greater than the predetermined value.

In the present embodiment, the synchronous motor 1 can be operated more stably, by using, as the second-torque command value, the d-axis current command value Id* which gradually increases in the region N including the peak of the torque T of the synchronous motor 1, and by changing over the control according to the magnitude of the q-axis current detected value Iqc or the q-axis current command value Iq*. Further, in the present embodiment, the weighted averaging is performed according to the q-axis current detected value Iqc or the q-axis current command value Iq*. However, another variable may be also used provided that the relationship between this variable and the q-axis current detected value Iqc or the q-axis current command value Iq* has been determined. For example, the torque T, the torque command value T*, the d-axis magnetic flux, the q-axis magnetic flux, the voltage phase angle, or the like may be used as a variable which changes depending on the q-axis current detected value Iqc or the q-axis current command value Iq*. Namely, when the torque T of the synchronous motor 1 has increased to fall within the range of the predetermined region N including the peak of the torque T of the synchronous motor 1, the voltage-phase control unit 13C controls and outputs the voltage phase angle θv such that the d-axis current detected value Idc matches the d-axis current command value Id*. On the other hand, when the torque T of the synchronous motor 1 is out of the range of the region N, the voltage-phase control unit 13C controls and outputs the voltage phase angle θv such that the q-axis current detected value Iqc matches the q-axis current command value Iq*.

Figure 24:
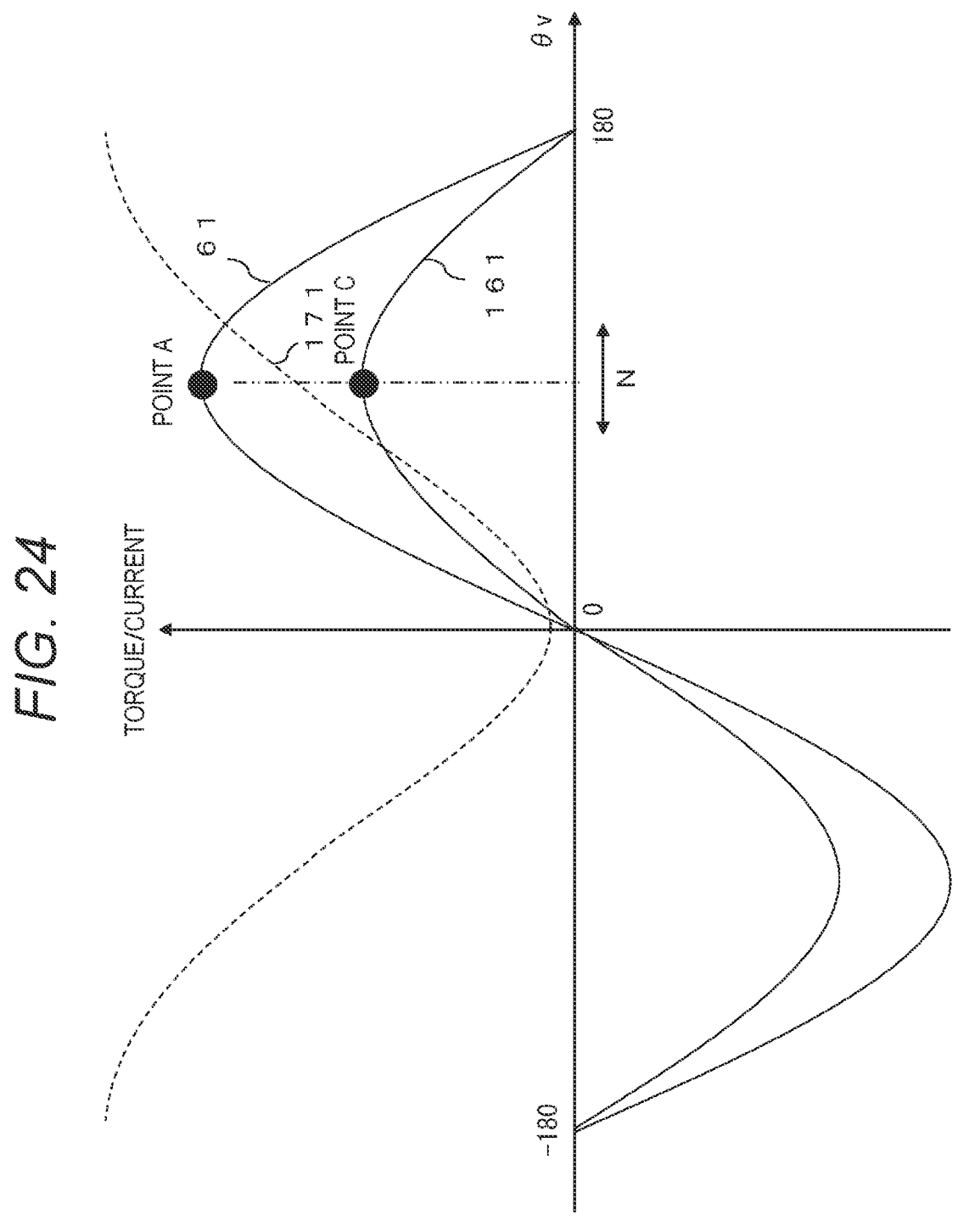
FIG. 24 is a graph illustrating the relationship between the voltage phase angle and the torque/current.

FIG. 24 is a graph illustrating the relationship between the voltage phase angle θv and the torque/current. The horizontal axis represents the voltage phase angle θv, while the vertical axis represents the torque/current.

In FIG. 24, a curve 161 illustrates the relationship between the q-axis current and the voltage phase angle θv, and a curve 171 illustrates the relationship between the d-axis current and the voltage phase angle θv. A curve 61 in FIG. 24 corresponds to the curve 61 illustrated by the solid line in FIG. 7, indicating the relationship between the voltage phase angle θv and the torque outputted from the synchronous motor 1.

The d-axis current indicated by the curve 171 gradually increases in the region N including the point A where the torque T indicated by the curve 61 is peaked. In particular, the d-axis current gradually increases up to when the voltage phase angle θv is 180° and, therefore, the control using the d-axis current command value is effective. Namely, in the present embodiment, the d-axis current command value is used as the second-torque command value. This makes it possible to utilize the torque T without imposing a limit thereon, up to a maximum torque which can be outputted from the synchronous motor 1. Although there has been described an example where the d-axis current command value is used as the second-torque command value, the second-torque command value is not limited to the d-axis current command value, and it is also possible to use a value which gradually increases in the region N including the point A where the torque T indicated by the curve 61 in FIG. 24 is peaked or a value combined with such a value. As described above, according to the present embodiment, it is possible to provide similar effects to those described in the first embodiment.

Incidentally, since the d-axis current is highly weighted in the first to sixth modification examples illustrated in FIGS. 10 to 15, it is possible to increase the maximum torque of the synchronous motor 1, as can be clearly seen from the fact that the d-axis current gradually increases as indicated by the curve 171 in FIG. 24.

Fourth Embodiment

Figure 25:
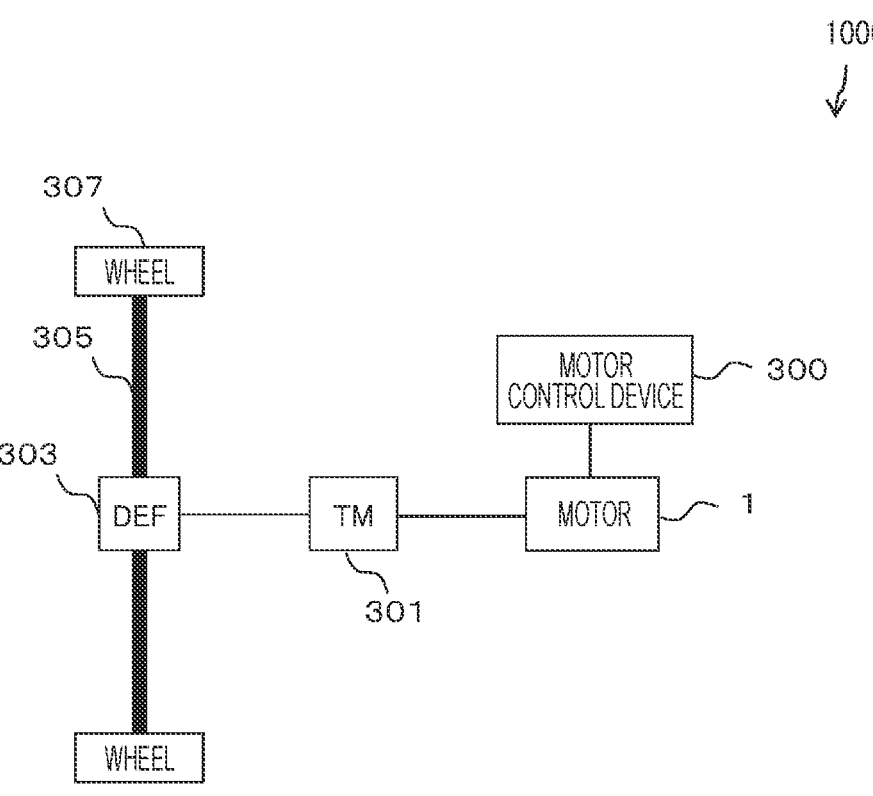
FIG. 25 is a structural diagram of an electric vehicle according to a fourth embodiment.

FIG. 25 is a structural diagram of an electric vehicle 1000.

A synchronous-motor control device 300 illustrated in FIG. 25 is constituted by the synchronous-motor control device 100, 100B or 100C described in the first to third embodiments. A power conversion unit 2 in the synchronous-motor control device 300 converts DC power from a DC voltage source 9 (for example, a battery) into AC power to drive a synchronous motor 1.

The synchronous motor 1 is connected to a transmission 301. The transmission 301 is connected to a drive shaft 305 with a differential gear 303 interposed therebetween and supplies power to wheels 307. Incidentally, it is also possible to adopt a structure adapted to directly connect the synchronous motor to the differential gear 303 without providing the transmission 301, and a structure adapted to apply the synchronous motor 1 and the synchronous-motor control device 300 to each of the front wheels and the rear wheels.

In a case of an automobile, the torque in a high-speed range is related to acceleration performance on an expressway, for example. In particular, when the torque in a high-speed range has come to be insufficient on a climbing road, the speed can not be increased. Therefore, there has been a strong demand for increasing the torque in a high-speed range. Furthermore, there has been a demand for reducing the size and weight of the synchronous motor 1 from the viewpoint of improvement of the power consumption, which has placed importance on the synchronous-motor control device 300 capable of realizing maximum torque which can be outputted from the synchronous motor 1. Similarly, a railway vehicle is a moving body like an automobile, and its acceleration performance during high-speed traveling is similarly important, since it affects traveling time between stations. By adopting the synchronous-motor control devices 100, 100B and 100C described in the first to third embodiments as the synchronous-motor control device 300, it is possible to improve the acceleration performance of an automobile or a railway vehicle in a high-speed range.

In the first to third embodiments, the synchronous-motor control devices 100, 100B, 100C, and 100D have been described with reference to the structural block diagrams. In these structural block diagrams, some or all of the blocks except the power conversion unit 2 may be realized by a processor (for example, a CPU, a GPU), and a program to be executed by the processor. In this case, the program is executed by the processor, thereby performing predetermined processing using a storage resource (for example, a memory) and/or an interface device (for example, a communication port) as appropriate, and, thus, the main constituent of the processing may be made to be the processor. Similarly, the main constituent of the processing performed through execution of the program may be a controller, a device, a system, a computer, or a node which has a processor. The main constituent of the processing performed through execution of the program may be any arithmetic unit, and may include a dedicated circuit (for example, a FPGA or an ASIC) for performing specific processing.

The program may be installed in a device such as a calculating machine from a program source. The program source may be, for example, a program distribution server or a storage medium readable by a calculating machine. When the program source is a program distribution server, the program distribution server may include a processor and a storage resource storing the program to be distributed, and the processor in the program distribution server may distribute the program to be distributed to another calculating machine. In the following description, two or more programs may be realized as one program, or one program may be realized as two or more programs.

According to the embodiments described above, the following effects and advantages can be provided.

(1) The synchronous-motor control device 100, 100B or 100C includes the torque-command-value conversion unit 11, 11B or 11C for converting a torque command value for the synchronous motor 1 into a second-torque command value which gradually increases in the region N including the point A where the torque T of the synchronous motor 1 is peaked, the voltage-phase control unit 13, 13B or 13C for controlling a voltage phase angle such that the torque of the synchronous motor 1 matches the second-torque command value, and the power conversion unit 2 for converting DC power into AC power based on the voltage phase angle and the rotational angle of the synchronous motor 1 and for outputting the AC power resulted from the conversion to the synchronous motor 1. This makes it possible to utilize the maximum torque which can be outputted from the synchronous motor, without imposing a limit thereon, through voltage phase control.

The present invention is not limited to the aforementioned embodiments, and other aspects conceivable within the scope of the technical concepts of the present invention are also included in the scope of the present invention as long as such other aspects do not impair the features of the present invention. Further, the respective embodiments and the plurality of modification examples which have been described above may be combined.

REFERENCE SIGNS LIST 1 synchronous motor
2 power conversion unit
3 current detector
4 magnetic-pole position detector
5 frequency calculation unit
6 voltage detector
7 coordinate conversion unit
9 DC voltage source
11, 11B, 11C torque-command-value conversion unit
12 torque calculation unit
13, 13B, 13C voltage-phase control unit
15 rectangular-wave generation unit
21 current command creation unit
23, 23B, 23C, 23D, 23E second-torque command value calculation unit
25, 25B, 25C, 25D, 25E second-torque calculation unit
31, 35, 41, 45, 53, 153, 154, 231, 235, 241, 245, 253, 254, 261, 265, 401, 405, 411, 415 gain
33, 43, 133, 143, 233, 243, 263, 403, 413, 425, 435 multiplier
55, 156, 256 PI controller
57, 157, 257 limiter
61 curve of correspondence between the torque and the voltage phase angle
63 curve of correspondence between the second torque and the voltage phase angle
71 magnetic-flux constant closed curve (voltage constant closed curve)
73 reluctance-torque constant curve
75 magnet-torque constant line
81, 83, 85, 232, 242, 262 adder
87, 89, 91 remainder calculation unit
94, 95, 151, 152, 251, 252 differentiator
96, 97, 98 sign determination unit
100, 100B, 100C, 100D, 300 synchronous-motor control device
131, 421, 431 q-axis magnetic-flux command calculation unit
141 q-axis magnetic-flux calculation unit
155, 255 weighted averaging device
161 curve of correspondence between the q-axis current and the voltage phase angle
171 curve of correspondence between the d-axis current and the voltage phase angle
301 transmission
303 differential gear
305 drive shaft
307 wheel
407, 417, 423, 433 low-pass filter (LPF)

The invention claimed is:

1. A synchronous-motor control device comprising:
a torque-command-value conversion unit for converting a torque command value for a synchronous motor into a second-torque command value which gradually increases in a region including a peak of a torque of the synchronous motor;

a voltage-phase control unit for controlling a voltage phase angle such that the torque of the synchronous motor matches the second-torque command value; and
a power conversion unit for converting DC power into AC power based on the voltage phase angle and a rotational angle of the synchronous motor, and for outputting the AC power resulted from the conversion to the synchronous motor.

2. The synchronous-motor control device according to claim 1, wherein
the torque-command-value conversion unit includes a current command creation unit for creating a d-axis current command value and a q-axis current command value, based on the torque command value for the synchronous motor, a DC voltage of the DC power, and speed information about the synchronous motor, and
the torque-command-value conversion unit calculates the second-torque command value, based on the d-axis current command value and the q-axis current command value created by the current command creation unit.

3. The synchronous-motor control device according to claim 2, wherein
the torque-command-value conversion unit multiplies the d-axis current command value by the q-axis current command value to determine the second-torque command value.

4. The synchronous-motor control device according to claim 3, wherein
the torque-command-value conversion unit multiplies the d-axis current command value by a first gain, then multiplies the q-axis current command value by the d-axis current command value multiplied by the first gain, further multiplies a result of this multiplication by a second gain to determine the second-torque command value.

5. The synchronous-motor control device according to claim 4, wherein
the first gain is a difference between a d-axis inductance and a q-axis inductance in the synchronous motor, and the second gain is a number of pole pairs in the synchronous motor.

6. The synchronous-motor control device according to claim 3, wherein
the torque-command-value conversion unit calculates a q-axis magnetic-flux command value based on the d-axis current command value and the q-axis current command value, and further multiplies the d-axis current command value by the q-axis magnetic-flux command value having been passed through a low-pass filter to determine the second-torque command value.

7. The synchronous-motor control device according to claim 2, further comprising:
a current detector for detecting a current value of the AC power outputted to the synchronous motor; and
a second-torque calculation unit for calculating second torque, by multiplying a d-axis current detected value based on the detected current value by the q-axis current command value having been passed through a low-pass filter,
wherein the voltage-phase control unit controls the voltage phase angle such that the second-torque command value matches the second torque.

8. The synchronous-motor control device according to claim 2, further comprising:
a current detector for detecting a current value of the AC power outputted to the synchronous motor; and a second-torque calculation unit for calculating second torque, by calculating a q-axis magnetic-flux command value based on the d-axis current command value and the q-axis current command value and then multiplying a d-axis current detected value based on the detected current value by the q-axis magnetic-flux command value having been passed through a low-pass filter, wherein the voltage-phase control unit controls the voltage phase angle such that the second torque matches the second-torque command value.

9. The synchronous-motor control device according to claim 1, further comprising:
a current detector for detecting a current value of the AC power outputted to the synchronous motor; and
a second-torque calculation unit for calculating second torque, from a d-axis current detected value and a q-axis current detected value based on the detected current value,
wherein the voltage-phase control unit controls the voltage phase angle such that the second-torque command value matches the second torque.

10. The synchronous-motor control device according to claim 9, wherein
the second-torque calculation unit multiplies the d-axis current detected value by a third gain, then multiplies the q-axis current detected value by the d-axis current detected value multiplied by the third gain, and further multiplies a result of this multiplication by a fourth gain to determine the second torque.

11. The synchronous-motor control device according to claim 10, wherein
the third gain is a difference between a d-axis inductance and a q-axis inductance in the synchronous motor, and the fourth gain is a number of pole pairs in the synchronous motor.

12. The synchronous-motor control device according to claim 1, wherein
the voltage-phase control unit controls the voltage phase angle such that the torque of the synchronous motor matches the torque command value when the torque of the synchronous motor or the torque command value is smaller than a predetermined value, while the voltage-phase control unit controls the voltage phase angle such that the torque of the synchronous motor matches the second-torque command value when the torque of the synchronous motor or the torque command value is equal to or greater than the predetermined value.

13. The synchronous-motor control device according to claim 1, further comprising
a current detector for detecting a current value of the AC power outputted to the synchronous motor,
wherein the torque-command-value conversion unit creates a d-axis current command value as the second-torque command value, and a q-axis current command value, based on the torque command value for the synchronous motor, a DC voltage, and speed information about the synchronous motor, and
the voltage-phase control unit controls the voltage phase angle such that a q-axis current detected value based on the detected current value matches the q-axis current command value when the torque of the synchronous motor is out of a range of a predetermined region, while the voltage-phase control unit controls the voltage phase angle such that a d-axis current detected value based on the detected current value matches the d-axis current command value when the torque of the synchronous motor falls within the range of the predetermined region.

14. The synchronous-motor control device according to claim 13, wherein
the voltage-phase control unit controls the voltage phase angle such that the q-axis current detected value matches the q-axis current command value when the q-axis current command value or the q-axis current detected value is smaller than a predetermined value, while the voltage-phase control unit controls the voltage phase angle such that the d-axis current detected value matches the d-axis current command value when the q-axis current command value or the q-axis current detected value is equal to or greater than the predetermined value.

15. An electric vehicle comprising:
the synchronous-motor control device according to claim 1; and
the synchronous motor adapted to be controlled by the synchronous-motor control device,
wherein the electric vehicle is supplied with power from the synchronous motor.

* * * * *